US011386401B2

(12) United States Patent
Johnson et al.

(10) Patent No.: US 11,386,401 B2
(45) Date of Patent: Jul. 12, 2022

(54) METHODS AND SYSTEMS TO PROVIDE PACKAGES OF REPAIR INFORMATION BASED ON COMPONENT IDENTIFIERS

(71) Applicant: Mitchell Repair Information Company, LLC, Poway, CA (US)

(72) Inventors: Lester B. Johnson, Escondido, CA (US); Todd Mercer, Descanso, CA (US); Thomas Southward, San Diego, CA (US)

(73) Assignee: Mitchell Repair Information Company, LLC, Poway, CA (US)

( * ) Notice: Subject to any disclaimer, the term of this patent is extended or adjusted under 35 U.S.C. 154(b) by 31 days.

(21) Appl. No.: 16/252,644

(22) Filed: Jan. 20, 2019

(65) Prior Publication Data

US 2020/0234252 A1 Jul. 23, 2020

(51) Int. Cl.
*G06Q 10/00* (2012.01)
*G06Q 30/02* (2012.01)
(Continued)

(52) U.S. Cl.
CPC ............. *G06Q 10/20* (2013.01); *G06F 9/451* (2018.02); *G06Q 30/0283* (2013.01); *G06F 3/04842* (2013.01)

(58) Field of Classification Search
CPC .... G06Q 10/20; G06Q 30/0283; G06F 9/451; G06F 3/04842; G05B 23/0248; G05B 23/0213; G05B 23/0216; G05B 23/0275

(Continued)

(56) References Cited

U.S. PATENT DOCUMENTS

| 4,404,639 A | * | 9/1983 | McGuire | G01R 31/007 |
| | | | | 701/114 |
| 5,657,233 A | * | 8/1997 | Cherrington | G01M 15/05 |
| | | | | 702/170 |

(Continued)

OTHER PUBLICATIONS

Collision Industry Electronic Commerce Association (CIECA); ARA Recycled Parts, Standards & Codes; Oct. 27, 2009.

(Continued)

*Primary Examiner* — Sarah M Monfeldt
*Assistant Examiner* — John S. Wasaff
(74) *Attorney, Agent, or Firm* — McDonnell Boehnen Hulbert & Berghoff LLP

(57) ABSTRACT

A computing system could have access to mapping data that maps each of a plurality of procedures to respective component identifier(s) used in collision-repair estimates, each procedure including information for repair of vehicle component(s) represented by the respective component identifier(s). Given this, the computing system could instruct a display device to display a visual identifier of a particular collision-repair estimate, could receive input indicative of selection of the visual identifier, and could responsively instruct the display device to display visual indicators representative of vehicle component(s) associated with the particular collision-repair estimate. Moreover, the computing system could receive input indicative of selection of one or more of the visual indicators representative of selected vehicle component(s), and could responsively determine, according to the mapping data, particular procedure(s) based on component identifier(s) representative of the selected vehicle component(s). The computing system could then provide an output based on the particular procedure(s).

34 Claims, 10 Drawing Sheets

(51) Int. Cl.
*G06F 9/451* (2018.01)
*G06F 3/04842* (2022.01)

(58) Field of Classification Search
USPC .......................................................... 705/305
See application file for complete search history.

(56) References Cited

U.S. PATENT DOCUMENTS

| | | | |
|---|---|---|---|
| 5,839,112 | A | 11/1998 | Schreitmueller et al. |
| 6,185,540 | B1 | 2/2001 | Schreitmueller et al. |
| 6,510,434 | B1 | 1/2003 | Anderson et al. |
| 6,768,935 | B1* | 7/2004 | Morgan ................. G06Q 10/10 701/29.6 |
| 7,444,216 | B2* | 10/2008 | Rogers ................. G06F 3/0481 701/31.4 |
| 8,799,034 | B1 | 8/2014 | Brandmaier et al. |
| 9,189,960 | B2* | 11/2015 | Couch ................... G08G 1/168 |
| 2003/0055812 | A1* | 3/2003 | Williams .............. G06F 16/904 |
| 2004/0243423 | A1* | 12/2004 | Rix ........................ G06Q 10/10 705/400 |
| 2006/0106796 | A1* | 5/2006 | Venkataraman ... G05B 23/0216 |
| 2006/0161313 | A1* | 7/2006 | Rogers ................. G06F 3/0481 701/1 |
| 2007/0179868 | A1 | 8/2007 | Bozym |
| 2007/0295800 | A1* | 12/2007 | Staats ................... G06Q 30/06 235/375 |
| 2009/0006476 | A1* | 1/2009 | Andreasen ............ G07C 5/008 |
| 2010/0175013 | A1* | 7/2010 | Krauter ................. G06Q 50/04 715/771 |
| 2012/0066010 | A1* | 3/2012 | Williams ........... G06Q 30/0641 705/4 |
| 2013/0317694 | A1* | 11/2013 | Merg ..................... G07C 5/006 701/31.6 |
| 2014/0058764 | A1 | 2/2014 | Vahidi et al. |
| 2014/0201022 | A1 | 7/2014 | Balzer |
| 2014/0279169 | A1* | 9/2014 | Leos ...................... G06Q 10/20 705/26.4 |
| 2015/0012169 | A1* | 1/2015 | Coard ................. G06Q 20/202 701/29.1 |
| 2015/0066781 | A1* | 3/2015 | Johnson ................. G06Q 10/00 705/305 |
| 2015/0106133 | A1 | 4/2015 | Smith, Jr. |
| 2015/0294419 | A1* | 10/2015 | Gonzalez Miranda ...................... G06Q 40/08 701/31.6 |
| 2017/0098200 | A1* | 4/2017 | Merg .................... G06Q 10/20 |
| 2017/0132854 | A1* | 5/2017 | Merg .................... G07C 5/0808 |
| 2018/0260793 | A1* | 9/2018 | Li ......................... G06N 3/084 |
| 2019/0206146 | A1* | 7/2019 | Higgins .................. G07C 3/08 |

OTHER PUBLICATIONS

Collision Industry Electronic Commerce Association (CIECA); Repair Order Folder Service, XML Implementation Guide, Appendix C, Business Usage FAQs; CIECA Release 2017R2 & Later, Beginning Oct. 2017.

Collision Industry Electronic Commerce Association (CIECA); Attachment XML Service, XML Implementation Guide, Appendix C, Business Use Cases and Standard XML Implementation Examples, Mar. 28, 2012.

Collision Industry Electronic Commerce Association (CIECA); Collision Industry Electronic Commerce Association (CIECA) Business Message Suite (BMS), Version 5.6.0 for Release 2017R2, Oct. 2017.

Collision Industry Electronic Commerce Association (CIECA); Scan Services, XML Implementation Guide; CIECA Release 2017R2 & Later, Beginning Oct. 2017.

Collision Industry Electronic Commerce Association (CIECA); Why Estimates BMS versus the EMS, A business perspective; CIECA Symposium, Denver Colorado, Sep. 8-10, 2014.

Mitchell International, Inc; Mitchell Estimating, Accurate Estimating = Profits; 2013.

Mitchell International, Inc; A Shop Program Solution for Insurance Carriers; 2013.

Mitchell International, Inc; Mitchell WorkCenter Appraisal; 2011.

Mitchell International, Inc; Mitchell WorkCenter Repair Management; 2011.

Mitchell International, Inc; Mitchell WorkCenter Review; 2011.

Mitchell International, Inc; Mitchell Repair Center; 2016.

* cited by examiner

```
┌─────────────────────────────────────────────────────────────────────┐
│ DETERMINE, BY A COMPUTING SYSTEM, ESTIMATE DATA FOR A PARTICULAR    │
│ COLLISION-REPAIR ESTIMATE THAT SPECIFIES REPAIR COSTS DUE TO        │
│ COLLISION BY A PARTICULAR VEHICLE, WHERE THE ESTIMATE DATA          │
│ SPECIFIES AT LEAST A PLURALITY OF COMPONENT IDENTIFIERS             │
│ REPRESENTATIVE OF A PLURALITY OF VEHICLE COMPONENTS OF THE          │
│ PARTICULAR VEHICLE, WHERE THE COMPUTING SYSTEM HAS ACCESS TO        │
│ MAPPING DATA THAT MAPS EACH OF A PLURALITY OF PROCEDURES TO ONE     │
│ OR MORE RESPECTIVE COMPONENT IDENTIFIERS USED IN COLLISION-REPAIR   │
│ ESTIMATES, AND WHERE EACH PROCEDURE INCLUDES INFORMATION FOR        │
│ REPAIR OF ONE OR MORE VEHICLE COMPONENTS REPRESENTED BY THE ONE     │
│ OR MORE RESPECTIVE COMPONENT IDENTIFIERS                            │
└─────────────────────────────────────────────────────────────────────┘
                                  │
                                  ▼  ── 202
┌─────────────────────────────────────────────────────────────────────┐
│ AFTER DETERMINING THE ESTIMATE DATA, TRANSMIT, BY THE COMPUTING     │
│ SYSTEM TO A DISPLAY DEVICE, AN INSTRUCTION THAT CAUSES THE DISPLAY  │
│ DEVICE TO DISPLAY A VISUAL IDENTIFIER OF THE PARTICULAR             │
│ COLLISION-REPAIR ESTIMATE                                           │
└─────────────────────────────────────────────────────────────────────┘
                                  │
                                  ▼  ── 204
┌─────────────────────────────────────────────────────────────────────┐
│ RECEIVE, BY THE COMPUTING SYSTEM, INPUT DATA INDICATIVE OF          │
│ SELECTION OF THE VISUAL IDENTIFIER OF THE PARTICULAR                │
│ COLLISION-REPAIR ESTIMATE, AND RESPONSIVELY INSTRUCTING THE         │
│ DISPLAY DEVICE TO DISPLAY VISUAL INDICATORS REPRESENTATIVE OF THE   │
│ PLURALITY OF VEHICLE COMPONENTS                                     │
└─────────────────────────────────────────────────────────────────────┘
                                  │
                                  ▼  ── 206
┌─────────────────────────────────────────────────────────────────────┐
│ RECEIVE, BY THE COMPUTING SYSTEM, INPUT DATA INDICATIVE OF          │
│ SELECTION OF ONE OR MORE OF THE VISUAL INDICATORS REPRESENTATIVE    │
│ OF ONE OR MORE SELECTED VEHICLE COMPONENTS FROM AMONG THE           │
│ PLURALITY OF VEHICLE COMPONENTS, AND RESPONSIVELY DETERMINE,        │
│ ACCORDING TO THE MAPPING DATA, ONE OR MORE PARTICULAR PROCEDURES    │
│ BASED ON ONE OR MORE PARTICULAR COMPONENT IDENTIFIERS               │
│ REPRESENTATIVE OF THE ONE OR MORE SELECTED VEHICLE COMPONENTS       │
└─────────────────────────────────────────────────────────────────────┘
                                  │
                                  ▼  ── 208
┌─────────────────────────────────────────────────────────────────────┐
│ PROVIDE, BY THE COMPUTING SYSTEM, AN OUTPUT BASED ON THE ONE OR     │
│ MORE PARTICULAR PROCEDURES                                          │
└─────────────────────────────────────────────────────────────────────┘
                                        ── 210
                            200 ↗
```

FIG. 2

| ESTIMATES | COMPONENTS ⇧ | PROCEDURES ⇧ | PACKAGE ⇧ |

Estimate ID: A0014 — 410

Customer:
John Smith

Vehicle Information:
2002 Dodge Ram 1500 Quad Cab 160" WB 4D P/U 8-5.9L Gasoline SMPI Black

VIN:
1D7HA18292J2662 — 412

| Part # — 420 | Part Name/Description — 421 | | Include in Search |
|---|---|---|---|
| 49363658 | RT Fender | | ☑ 416A |
| 55455976 | 5.9 L Magnum V8 Engine | | ☐ 416B |
| 77866379 | Dodge Ram Replacement Bumper 2nd Gen | | ☑ 416C |

414

( SEARCH ) — 418

```
┌─────────────────────────────────────────────────────────────────────┐
│  RECEIVE, BY A COMPUTING SYSTEM, A REQUEST INDICATING ONE OR MORE   │
│ PARTICULAR COMPONENT IDENTIFIERS, WHERE THE COMPUTING SYSTEM HAS    │
│ ACCESS TO MAPPING DATA THAT MAPS EACH OF A PLURALITY OF PROCEDURES  │
│ TO ONE OR MORE RESPECTIVE COMPONENT IDENTIFIERS, AND WHERE EACH     │
│ PROCEDURE SPECIFIES INFORMATION FOR REPAIR OF ONE OR MORE VEHICLE   │
│ COMPONENTS REPRESENTED BY THE ONE OR MORE RESPECTIVE COMPONENT      │
│                            IDENTIFIERS                               │
└─────────────────────────────────────────────────────────────────────┘
                                   │
                                   ▼              └─502
┌─────────────────────────────────────────────────────────────────────┐
│   IN RESPONSE TO RECEIVING THE REQUEST, DETERMINE, BY THE COMPUTING │
│   SYSTEM AND ACCORDING TO THE MAPPING DATA, ONE OR MORE PARTICULAR  │
│    PROCEDURES BASED ON THE ONE OR MORE PARTICULAR COMPONENT         │
│                           IDENTIFIERS                                │
└─────────────────────────────────────────────────────────────────────┘
                                   │
                                   ▼              └─504
┌─────────────────────────────────────────────────────────────────────┐
│  GENERATE, BY THE COMPUTING SYSTEM, A REPLY TO THE REQUEST THAT     │
│  INCLUDES INFORMATION FROM THE ONE OR MORE PARTICULAR PROCEDURES    │
└─────────────────────────────────────────────────────────────────────┘
                                   │
                                   ▼              └─506
┌─────────────────────────────────────────────────────────────────────┐
│      OUTPUT, BY THE COMPUTING SYSTEM, THE GENERATED REPLY TO THE    │
│                              REQUEST                                 │
└─────────────────────────────────────────────────────────────────────┘
                                                  └─508
```

METHODS AND SYSTEMS TO PROVIDE PACKAGES OF REPAIR INFORMATION BASED ON COMPONENT IDENTIFIERS

BACKGROUND

Many products produced by manufacturers occasionally have to be repaired. But many owners are unequipped or otherwise unable to repair certain products. Therefore, such owners may depend on professional repair technicians and/or other individuals to service or repair the owner's product.

In practice, the repair technicians and/or other individuals could use a computing system to assist with the repair process. For instance, the computing system might display a graphical user interface (GUI) that (i) enables submission of a request for information regarding servicing or repairing a product and (ii) provides information based on the request. As an example, the information may be regarding the type of repair or service needed or performed, among other possibilities.

Although the computing system could provide a variety of information, the computing system may still have various deficiencies. For example, the computing system may not necessarily indicate the most optimal repair(s) or service(s) via the GUI. In another example, the GUI may lack various interface controls, and thus submission of the request and/or subsequent review of the information via the GUI might be an error-prone, unintuitive, and/or time-consuming process. Consequently, it may be beneficial to develop technical improvements to such a computing system that is relied upon during the repair process, because those improvements would in turn improve the repair process itself.

OVERVIEW

Example embodiments are described herein. In a first example embodiment, a method is disclosed. The method involves determining, by a computing system, estimate data for a particular collision-repair estimate that specifies repair costs due to collision by a particular vehicle, where the estimate data specifies at least a plurality of component identifiers representative of a plurality of vehicle components of the particular vehicle, where the computing system has access to mapping data that maps each of a plurality of procedures to one or more respective component identifiers used in collision-repair estimates, and where each procedure includes information for repair of one or more vehicle components represented by the one or more respective component identifiers. The method also involves, after determining the estimate data, transmitting, by the computing system to a display device, an instruction that causes the display device to display a visual identifier of the particular collision-repair estimate. The method additionally involves receiving, by the computing system, input data indicative of selection of the visual identifier of the particular collision-repair estimate, and responsively instructing the display device to display visual indicators representative of the plurality of vehicle components. The method further involves receiving, by the computing system, input data indicative of selection of one or more of the visual indicators representative of one or more selected vehicle components from among the plurality of vehicle components, and responsively determining, according to the mapping data, one or more particular procedures based on one or more particular component identifiers representative of the one or more selected vehicle components. The method yet further involves providing, by the computing system, an output based on the one or more particular procedures.

In a second example embodiment, a computing system is disclosed. The computing system includes a computer-readable medium, at least one processor, and program instructions stored on the computer-readable medium and executable by the at least one processor to carry out operations in accordance with the first example embodiment.

In a third example embodiment, a computer-readable medium is disclosed. The computer-readable medium have stored thereon instructions executable by at least one processor to cause a computing system to perform operations in accordance with the first and/or second example embodiments.

In a fourth example embodiment, another method is disclosed. The method involves receiving, by a computing system, a request indicating one or more particular component identifiers, where the computing system has access to mapping data that maps each of a plurality of procedures to one or more respective component identifiers, and where each procedure specifies information for repair of one or more vehicle components represented by the one or more respective component identifiers. The method also involves, in response to receiving the request, determining, by the computing system and according to the mapping data, one or more particular procedures based on the one or more particular component identifiers. The method additionally involves generating, by the computing system, a reply to the request that includes information from the one or more particular procedures. The method further involves outputting, by the computing system, the generated reply to the request.

In a fifth example embodiment, another computing system is disclosed. The computing system includes at least one processor, a data storage device containing mapping data that maps each of a plurality of procedures to one or more respective component identifiers, and program instructions stored on the data storage device and executable by the at least one processor to perform operations in accordance with the fourth example embodiment.

In a sixth example embodiment, a computer-readable medium is disclosed. The computer-readable medium have stored thereon instructions executable by at least one processor to cause a computing system to perform operations in accordance with the fourth and/or fifth example embodiments.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the following drawings.

FIG. 2 is a flowchart depicting a set of functions that can be carried out in accordance with one or more example embodiments.

FIG. 4B illustrates a GUI window that enables selection of vehicle component(s) associated with the selected collision-repair estimate, in accordance with one or more example embodiments.

FIG. 5 is a flowchart depicting another set of functions that can be carried out in accordance with one or more example embodiments.

DETAILED DESCRIPTION

I. Introduction

Figure 1:
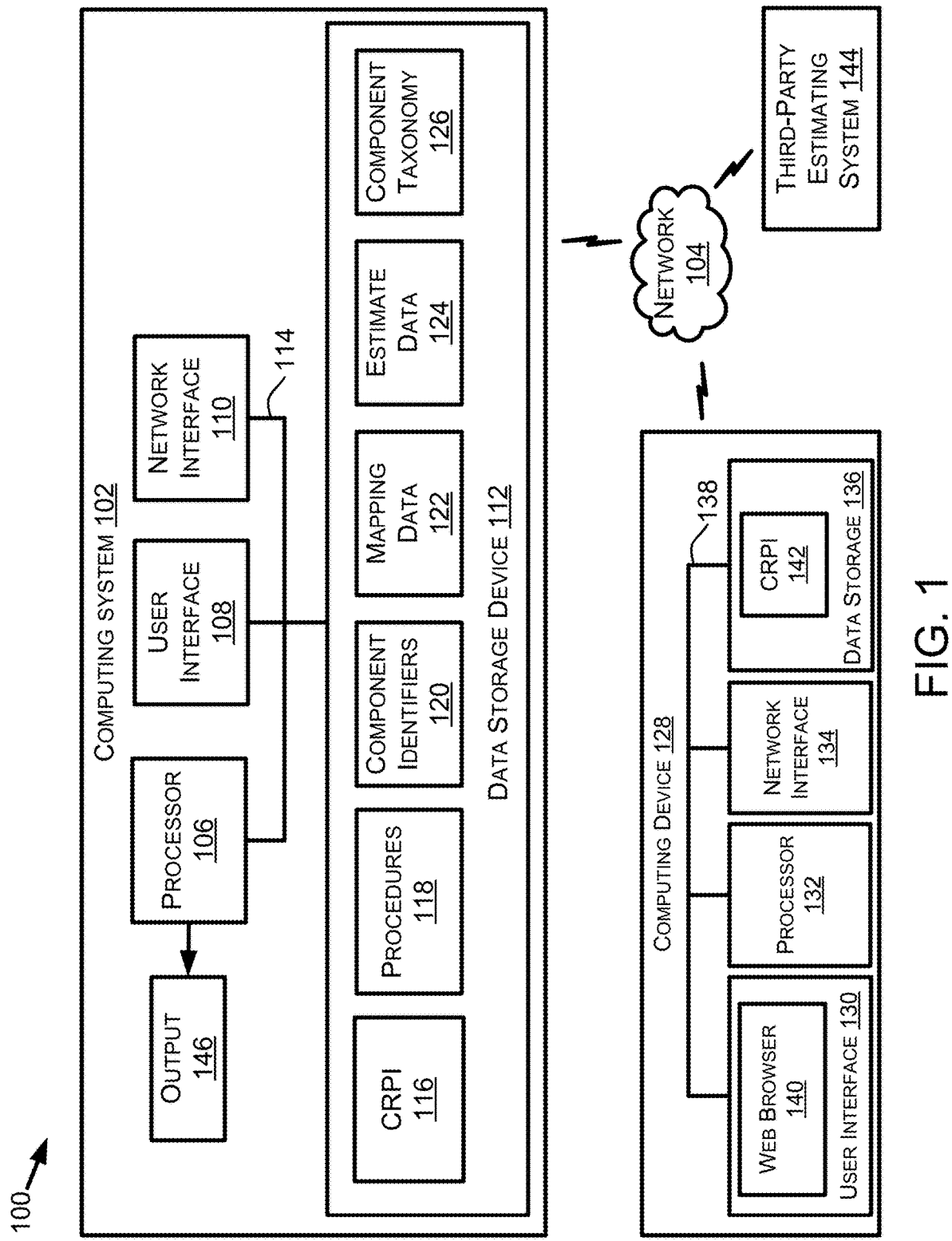
FIG. 1 is a block diagram of a system in accordance with one or more example embodiments.

This description describes several example embodiments including example embodiments related to providing packages of repair information based on component identifiers. At least some of the example embodiments include, but are not limited to include, one or more of the following features: (a) determining, by a computing system, estimate data for a particular collision-repair estimate that specifies repair costs due to collision by a particular vehicle, where the estimate data specifies at least a plurality of component identifiers representative of a plurality of vehicle components of the particular vehicle, where the computing system has access to mapping data that maps each of a plurality of procedures to one or more respective component identifiers used in collision-repair estimates, and where each procedure includes information for repair of one or more vehicle components represented by the one or more respective component identifiers; (b) after determining the estimate data, transmitting, by the computing system to a display device, an instruction that causes the display device to display a visual identifier of the particular collision-repair estimate; (c) receiving, by the computing system, input data indicative of selection of the visual identifier of the particular collision-repair estimate, and responsively instructing the display device to display visual indicators representative of the plurality of vehicle components; (d) receiving, by the computing system, input data indicative of selection of one or more of the visual indicators representative of one or more selected vehicle components from among the plurality of vehicle components, and responsively determining, according to the mapping data, one or more particular procedures based on one or more particular component identifiers representative of the one or more selected vehicle components; and (e) providing, by the computing system, an output based on the one or more particular procedures.

Although many of the example embodiments are described with respect to a vehicle, the example embodiments can be applicable to products or repairable items other than a vehicle. As an example, the other products or repairable items can include home appliances, such as a refrigerator, a dishwasher, or a washing machine, or a consumer electronic device, such as a television, a cellular phone, or a tablet device. Other examples of the other products or repairable items are also possible. Accordingly, for embodiments based on these other products or repairable items, the term vehicle in the described embodiments can be replaced with a name of the other product or repairable item.

In this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. For purpose of this description, the terms "multiple" and "a plurality of" refer to "two or more" or "more than one."

The block diagram(s) and flow chart(s) shown in the figures are provided merely as examples and are not intended to be limiting. Many of the elements illustrated in the figures or described herein are functional elements that can be implemented as discrete or distributed elements or in conjunction with other elements, and in any suitable combination and location. Those skilled in the art will appreciate that other arrangements and elements (e.g., machines, interfaces, functions, orders, and/or groupings of functions) can be used instead. Furthermore, various functions described and/or shown as being performed by one or more elements can be carried out by a processor executing computer-readable program instructions or by any combination of hardware, firmware, or software. For purposes of this description, execution of program instructions contained in a data storage device to perform some function can include executing all of those program instructions or only a portion of those program instructions.

II. Example Architecture

FIG. 1 is a block diagram of a system 100 in accordance with one or more example embodiments. Various combinations of the elements shown in FIG. 1 can be arranged as other systems or as a sub-system to carry out example embodiments described herein. System 100 includes a computing system 102 and a network 104. Network 104 can include a wide area network (WAN), such as the Internet or a portion thereof. Additionally or alternatively, network 104 can include a wireless network, a wired network, a local area network (LAN), or some other type of network. Network 104 can include two or more of the aforementioned example networks and/or some other type of network.

The network 104 can include one network or multiple networks. Two or more of the multiple networks can be operatively coupled to each other. A network of the network 104 can carry communications over a wired network and/or a wireless network. In some implementations, a network of the network 104 includes a circuit-switched digital network and/or a packet-switched network. The network 104 includes multiple network devices. As an example, a network device on the network 104 can include an access point, an antenna, a base station, a gateway, a hub, a modem, a network cable, a network interface card, a relay, a receiver, a router, a switch, a transceiver, and/or a transmitter. Any one or more of those network devices can be installed in the network 104 as an intermediary network device. Other examples of a network device on the network 104 are possible.

In some implementations, the network 104 includes a local area network (LAN) and/or a wide area network (WAN). The LAN and/or WAN can carry data using packet-switched or circuit-switched technologies. The LAN and/or WAN can include an air interface or a wire to carry the data. The network 104 can include a network or at least a portion of a network that carries out communications using a Transmission Control Protocol (TCP) and the Internet Protocol (IP), such as the network commonly referred to as the Internet.

The term "data" within this description can be used interchangeably with the term "information" and/or similar terms. Unless stated otherwise, the data described in this description can include a single datum or multiple datum. The data described herein can be transmitted (e.g., uploaded) and/or received (e.g., downloaded). As an example, any transmission of data described herein can occur directly from a transmitting device (e.g., a transmitter) to a receiving device (e.g., a receiver). As another example, any transmission of data described herein can occur indirectly from the transmitter to a receiver via one or more intermediary network devices. The transmission of any of data described herein can include transmitting the data over an air interface (e.g., using radio signals (i.e., wirelessly)). The transmission of any of data described herein can include transmitting the data over a network cable (e.g., a single wire, a twisted pair of wires, a fiber optic cable, a coaxial cable, a wiring harness, a power line, a printed circuit, a CAT5 cable, and/or CAT6 cable). The wire can be referred to as a "conductor" and/or by another term. As an example, transmission of data over the conductor can occur electrically and/or optically. A transmission of data can be referred to as a "communication." A communication can, but need not necessarily, include a "request communication" or a "response communication."

Computing system 102 includes a processor 106, a user interface 108, a network interface 110, and a data storage device 112, all of which can be linked together via a system bus, network, or other connection mechanism 114.

A processor, such as processor 106, can include one or more general purpose processors (e.g., INTEL single core microprocessors or INTEL multicore microprocessors) or one or more special purpose processors (e.g., digital signal processors). A processor, such as processor 106, can be configured to execute computer-readable program instructions, such as computer-readable program instructions (CRPI) 116. For purposes of this description, processor 106 executing CRPI 116 to perform some function described herein can include executing a portion of CRPI 116 or the entirety of CRPI 116. Executing a portion or the entirety of CRPI 116 can include executing some of the computer-readable program instructions multiple times. Processor 106 can be programmed to perform any one or any combination of functions performed by execution of a program instruction of CRPI 116.

User interface 108 can include a component and/or an interface to a component operable to enter data or information into computing system 102. Additionally or alternatively, user interface 108 can include a component configured to present data or information output by computing system 102. The foregoing components can be referred to as user interface components. User interface 108 can include one or more audio/visual ports or communication ports that connect to a user interface component by a wired or wireless user interface communication link. In practice, a user interface component could enable the computing system 102 to display a GUI that includes interface control(s) for providing various types of input.

User interface 108 can include one or more of the user interface components. As an example, the user interface components can, but need not necessarily, include an infra-red remote control device, a display device, a loud speaker configured to convert electrical signals to audible sounds, a keyboard, a touch screen, a pointing device, such as a computer mouse, or some other component for generating signals to enter data or information into computing system 102 or to present data or information output by user interface 108.

User interface 108 can include a transmitter or transceiver to provide the data or information to another user interface component or to another element of computing system 102. The data or information provided by user interface 108 can include, but is not limited to include, information associated with procedures, such as procedures 118 also shown by FIG. 1 and further described herein.

Network interface 110 can include an interface to one or more communication networks, such as network 104. To communicate using a wireless communication networks, network interface 110 can include one or more antennas for transmitting or receiving wireless communications. Network interface 110 can include one or more communication ports configured to connect to a wired communication link of a network, such as a coaxial cable, an Ethernet cable, a fiber optic cable, a digital subscriber line (DSL), a telephone line of a public switched telephone network (PSTN) or some other wired connector. Network interface 110 can include a network controller including a transmitter, a receiver, or a transceiver. The transmitter or transceiver can provide data or information to a communication port for transmission as network communications over the connected network. The receiver or transceiver can receive data or information received at a communication port from the connected network.

A transceiver, such as a transceiver of the network interface 110 and/or any other transceiver discussed in this description, can include one or more transceivers. Each transceiver includes one or more transmitters configured to transmit data onto a network, such as the network 104, and/or a system bus or network. Each transceiver includes one or more receivers configured to receive data or a communication carried over a network, such as the network 104 and/or a system bus or network. Unless stated differently, any data described as being transmitted to a device is considered to be received by that device. Similarly, unless stated differently, any data described as being received from a device is considered to be transmitted by that device (directly or indirectly). For some implementations, a transceiver can include a transmitter and a receiver in a single semiconductor chip. In at least some of those implementations, the semiconductor chip can include a processor.

In at least some of the implementations, a transmitter, such as a transmitter within any transceiver described in this description, transmits radio signals carrying data, and a receiver, such as a receiver within any transceiver described in this description, receives radio signals carrying data. A transceiver with a radio transmitter and radio receiver can include one or more antennas and can be referred to as a "radio transceiver," an "RF transceiver," or a "wireless transceiver."

A radio signal transmitted or received by a radio transceiver can be arranged in accordance with one or more wireless communication standards or protocols such as an IEEE® standard, such as (i) an IEEE® 802.11 standard for wireless local area networks (wireless LAN) (which is sometimes referred to as a WI-FI® standard) (e.g., 802.11a, 802.11b, 802.11g, or 802.11n), (ii) an IEEE® 802.15 standard (e.g., 802.15.1, 802.15,3, 802.15.4 (ZIGBEE®), or 802.15.5) for wireless personal area networks (PANs), (iii) a BLUETOOTH® version 4.1 or 4.2 standard developed by the Bluetooth Special Interest Group (SIG) of Kirkland, Wash., (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, or (xviii) the LoRaWAN communication standard. Other examples of the wireless communication standards or protocols are possible.

In at least some of the implementations, a transmitter, such as a transmitter within any transceiver described in this description, can be configured to transmit a signal (e.g., one or more signals or one or more electrical waves) carrying or representing data onto a wire (e.g., one or more wires). Similarly, a receiver, such as a receiver within any transceiver described in this description, can be configured to receive via a wire a signal carrying or representing data over the wire. The wire can be part of a network, such as the network 104. The signal carried over a wire can be arranged in accordance with a wired communication standard such as a Transmission Control Protocol/Internet Protocol (TCP/IP), an IEEE® 802.3 Ethernet communication standard for a LAN, a data over cable service interface specification (DOC SIS standard), such as DOC SIS 3.1, a USB specification (as previously described), or some other wired communication standard.

A transceiver that is configured to carry out communications over the network 104 can, but need not necessarily, include at least one of: a modem, a network interface card, or a chip mountable on a circuit board. As an example the chip can include a CC3100 Wi-Fi® network processor available from Texas Instruments, Dallas, Tex., a CC256MODx Bluetooth® Host Controller Interface (HCI) module available from Texas instruments, or a different chip for communicating via Wi-Fi®, Bluetooth® or another communication protocol.

A data storage device, such as such as data storage device 112 or any other data storage device discussed in this description or included within a device or system described in this description, may include a non-transitory computer-readable medium, a transitory computer-readable medium, or both a non-transitory computer-readable medium and a transitory computer-readable medium. In one respect, a non-transitory computer-readable medium may be integrated in whole or in part with a processor. In another respect, a non-transitory computer-readable medium, or a portion thereof, may be separate and distinct from a processor.

A non-transitory computer-readable medium may include, for example, a volatile or non-volatile storage component, such as an optical, magnetic, organic or other memory or disc storage. Additionally or alternatively, a non-transitory computer-readable medium may include, for example, a random-access memory (RAM), a read-only memory (ROM), a programmable read-only memory (PROM), an erasable programmable read-only memory (EPROM), an electrically erasable programmable read-only memory (EEPROM), a compact disk read-only memory (CD-ROM), or another memory device that is configured to provide data or CRPI to a processor.

A transitory computer-readable medium may include, for example, CRPI provided over a communication link, such as a communication link which is connected to or is part of the network 104. The communication link may include a digital or analog communication link. The communication link may include a wired communication link or a wireless communication link.

A computer-readable medium may be referred to by other terms such as a "computer-readable storage medium," a "data storage device," a "memory device," a "memory," or a "computer-readable database." Any of those alternative terms may be preceded with the prefix "transitory" or "non-transitory."

Data storage device 112 can store a variety of data. The data stored by data storage device 112 can be data that was provided to data storage device 112 for storage from processor 106, user interface 108 or network interface 110. As shown in FIG. 1, data storage device 112 can store computer-readable program instructions (CRPI) 116. CRPI 116 can include program instructions executable by processor 106 to perform any one or more of the operations, functions, or actions illustrated in blocks 202-210 in FIG. 2 and/or in blocks 502-508 in FIG. 5 as described below in this description. Moreover, data storage device 112 can store procedures 118, component identifiers 120, mapping data 122, estimate data 124, and component taxonomy 126, all of which are described herein in more detail.

In some implementations, computing system 102 could engage in communication(s) with a computing device 128, such as via network 104, for instance. As shown by FIG. 1, computing device 128 includes a user interface 130, a processor 132, a network interface 134, and a data storage device 136, all of which can be linked together via a system bus, network, or other connection mechanism 138.

User interface 130 can include an interface to components that are configured to enter data or information into computing device 128 or to components that are configured to present data or information output by computing device 128. Any of those components can be referred to as a user interface components. User interface 130 can include one or more audio/visual ports or communication ports that connect to a user interface component by a wired or wireless user interface communication link. Data or information entered into computing device 128 by user interface 130 can include data or information associated with components identifiers, such as with component identifiers 120, for instance.

User interface 130 can include one or more of the user interface components. As an example, the user interface components can, but need not necessarily, include an infrared remote control device, a display device, a loud speaker configured to convert electrical signals to audible sounds, a keyboard, a touch screen, a pointing device, such as a computer mouse, or some other component for generating signals to enter data or information into computing device 128 or to present data or information output by user interface 130. User interface 130 can include a transmitter or transceiver to provide the data or information to another user interface component.

A display device of the user interface 130 can include one or more displays. As an example, each display of the one or more displays can include a capacitive touch screen display, a resistive touch screen display, a plasma display, a light emitting diode (LED) display, a cathode ray tube display, an organic light-emitting diode (OLED) display, or a liquid crystal display (LCD). An OLED display can include an active-matrix OLED or a passive-matrix OLED. The LCD can include a backlit, color LCD. A display can include a touch screen display with the LCD. For instance, a display can include a capacitive or resistive touch screen display. Other examples of a display are also possible.

In some implementations, computing device 128 (or more specifically processor 132) may be configured to execute a web browser 140, and user interface 130 may in turn be configured to display the web browser 140. The web browser 140 can be an application or the like that may retrieve, present, and/or navigate through information on the World Wide Web and/or on private websites. The web browser 140 may include a web-display tool or the like that provides for or otherwise supports display of information, such as information received from computing system 102. For example, the web-display tool may display information associated with procedures, such as procedures 118, in line with the present disclosure.

Processor 132 can be configured to execute computer-readable program instructions, such as computer-readable program instructions (CRPI) 142 stored within data storage device 136. For purposes of this description, processor 132 executing CRPI 142 to perform some function described herein can include executing a portion of CRPI 142 or the entirety of CRPI 142. Executing a portion or the entirety of CRPI 142 can include executing some of the computer-readable program instructions multiple times.

Network interface 134 can include an interface to one or more communication networks, such as network 104. To communicate using a wireless communication network, network interface 134 can include one or more antennas for transmitting or receiving wireless communications. Network interface 134 can include one or more communication ports configured to connect to a wired communication link of a network. Examples of the wired communication link are listed elsewhere herein. Network interface 134 can include a network controller including a transmitter, a receiver, or a transceiver. The transmitter or transceiver can provide data or information to a communication port for transmission as network communications over the connected network. The receiver or transceiver can receive data or information received at a communication port from the connected network. The data or information provided by network interface 134 to the network can include information associated with component identifiers, such as component identifiers 120, for instance.

Data storage device 136 can include a non-transitory computer-readable storage medium (i.e., two or more computer-readable storage mediums) readable by processor 132. The or each non-transitory computer-readable storage medium can include volatile or non-volatile storage components, such as optical, magnetic, organic or other memory or disc storage, which can be integrated in whole or in part with a processor 132.

CRPI 142 can include program instructions (i) for transmitting data to a computing system, such as computing system 102, based on data input by user interface 130 or a user interface component thereof and/or for (ii) receiving data from a computing system, such as computing system 102, and then using the received data as basis for operating user interface 130 or a user interface component thereof. CRPI 142 can additionally or alternatively include other program instructions without departing from the scope of the present disclosure.

In an example scenario, computing system 102 and/or computing device 128 can (but need not necessarily) each respectively include or be implemented as a portion of a small-form factor portable (i.e., mobile) electronic device such as a smartphone (e.g., an IPHONE® smartphone from Apple Inc. of Cupertino, Calif., or a GALAXY S® smartphone from Samsung Electronics Co., Ltd. of Maetan-Dong, Yeongtong-Gu Suwon-Si, Gyeonggi-Do, Republic of Korea), a tablet device (e.g., an IPAD® tablet device from Apple Inc., a SAMSUNG GALAXY TAB tablet device from Samsung Electronics Co., Ltd.), a wearable computing device (e.g., a wireless web-watch device or a personal headset device), or a personal computing system (e.g., a laptop computer or non-laptop computer configuration).

In the foregoing scenario or in another example scenario, computing system 102 could be a repair information system (could also be referred to as a vehicle repair data (VRD) system or the like) and computing device 128 could be a vehicle repair tool (VRT).

A VRT can include any of a variety of repair tools a repair technician, a product owner, a person working at a repair shop, or some other person can use to repair a vehicle. Repairing a vehicle can include, but is not limited to include, diagnosing a vehicle, servicing a vehicle, performing maintenance (e.g., preventive maintenance) on a vehicle, performing collision repair, or verifying a repair performed on a vehicle to correct a vehicle malfunction. Accordingly, a VRT can be referred to as one or more of the following terms: a vehicle diagnostic tool, a vehicle service tool, a vehicle maintenance tool, and a vehicle repair verification tool, or more generally, a machine.

In some cases, a VRT can include a code reader, such as a one-dimensional bar code reader or a two-dimensional bar coder reader. The code reader can read and decode a code on a vehicle, such as a VIN bar code, a code on a replacement part, such as a bar code or quick-response code on packaging of a replacement part, or some other type of code.

In those or in other cases, a VRT can include scan tool functionality. The scan tool functionality can include multiple scan tool functions executable by the VRT and a menu navigable by a user to select a particular scan tool function to execute on a particular vehicle. A scan tool function can be referenced in a procedure of procedures 118. The VRT can be configured to execute a scan tool function referenced in the procedure. Executing a scan tool function referenced in the procedure can include displaying the scan tool function on user interface 130 with or with an interface control prompting a user to approve performance of the scan tool function. Displaying the scan tool function on user interface 130 based on being referenced in a procedure provides a way to access a scan tool function within the VRT without a user navigating the menu.

As an example, performing the scan tool function can include transmitting a vehicle data message to a vehicle operatively connected to the VRT. As another example, performing the scan tool function can include displaying data contained in a VDM the vehicle sends in response to the VDM. The data, for example, can include a parameter identifier (PID) and a parameter associated with the PID. As yet another example, performing the scan tool function can include sending a VDM including a VDM to perform a functional test, a component test, or a reset procedure, a calibration procedure, and/or a reprogramming procedure in the vehicle.

A vehicle is a mobile machine that can be used to transport a person, people, or cargo. A vehicle can be driven or otherwise guided along a path (e.g., a paved road or otherwise) on land, in water, or in the air or outer space. A vehicle can be wheeled, tracked, railed, or skied. A vehicle can be guided by a user within the vehicle or by a user outside of the vehicle by use of a remote control. A vehicle can be guided at least partially autonomously. In the case of an autonomous vehicle, the vehicle can at least sometimes be guided along a path without any person or cargo inside or on the vehicle. A vehicle can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, a farm machine, a van (such as a dry or refrigerated van), a tank trailer, a platform trailer, or an automobile carrier. A vehicle can include or use any appropriate voltage or current source, such as a battery, an alternator, a fuel cell, and the like. A vehicle can include or use any desired drive system or engine. That drive system or engine can include items that use fossil fuels, such as gasoline, natural gas, propane, and the like, electricity, such as that generated by a battery, magneto, fuel cell, solar cell and the like, wind and hybrids or combinations thereof.

A vehicle can comprise one or more vehicle systems. Vehicle systems can be defined in a variety of ways and using a variety of terms. In one respect, a vehicle system can operate independently of other vehicle systems to achieve an intended purpose. In another respect, two or more vehicle systems can operate cooperatively to achieve an intended purpose. A vehicle system comprises multiple separately replaceable vehicle components. Two or more defined vehicle systems can comprise the same vehicle component. For example, a power train system and a drive train system of a vehicle known as an automobile can both be defined to include the automatic transmission of the vehicle. Other examples of vehicle systems contained in some automobiles include a braking system, an engine cooling system, an emissions system, an entertainment system, an exhaust system, a restraint system, and a supplemental restraint system. Moreover, a vehicle can exhibit a symptom, which may define an observable or otherwise recognizable problem with the vehicle, such as "check engine light on" or "oil leaking."

A vehicle component (could also be referred to herein as a "component", "part", or "vehicle part") may be a constituent element of a vehicle. Generally, vehicle components can be classified in a variety of ways and using a variety of terms. Examples classifications of vehicle component include electrical, hydraulic, mechanical, optical, wireless, chemical, electro-mechanical, or fluids. Other example classifications of vehicle components exist as well. Some vehicle components connect or keep connected two or more other vehicle components. Examples of the vehicle components that provide for connecting two or more other vehicle components include fasteners (e.g., screws, bolts, nuts, or panel fasteners), hoses, fuses, circuit breakers, optical circuits, and electrical circuits. Mechanical vehicle components can include vehicle body parts. Examples of vehicle body parts include a fender, a hood, a door, a frame, a mirror, a grille, a bumper, vehicle glass (such as a windshield), among others.

In practice, there may be numerous types of identifiers associated with vehicle(s), their component(s), and/or symptoms exhibited by vehicle(s), among others. Such identifiers could be established as computer-readable identifiers, so that processor(s), such as processor 106 and/or processor 132 could read or otherwise refer to those identifiers.

By way of example, a vehicle can be respectively represented by an identifier, which could be unique a sequence of alphanumeric characters, such as letters, numbers, symbols, and/or other characters that uniquely refer to a particular vehicle. Given this, a processor and/or an individual can identify a vehicle based on its respective identifier. A vehicle identifier may represent a particular vehicle or a particular class of vehicle. Thus, a vehicle identifier could be defined with respect to or in association with one or more vehicle attributes.

In another example, a feature of a vehicle, such as one or more vehicle components, can be respectively represented by an identifier, which could be unique a sequence of alphanumeric characters, such as letters, numbers, symbols, and/or other characters that uniquely refer to a particular feature. Given this, a processor and/or an individual can identify a feature of a vehicle (e.g., a vehicle component) based on its respective identifier. In some cases, a vehicle component identifier may represent a particular set of vehicle component(s) that collectively form a system or a sub-system of a vehicle, in which case the vehicle component identifier could also be referred to as a vehicle system identifier or a vehicle sub-system identifier.

In yet another example, a symptom identifier may represent a symptom that a vehicle is exhibiting or otherwise could exhibit. For instance, a symptom identifier may be a diagnostic trouble code (DTC). Other examples are also possible.

Given this, a repair information system could facilitate repair of a given vehicle, and thus a repair shop might rely on a repair information system to generate a "package" of repair information indicating repair job(s) to be performed. Such a package could take on any feasible form. For instance, such a package could be computer-readable and can be thus arranged as a structured query language (SQL) file, an extensible markup language (XML) file, a file with a PDF extension, an image file, a text file, and/or some other type of computer-readable file or data structure. Given this, the repair information system could be configured to display or otherwise output a computer-readable package (e.g., via user interface 108). Additionally or alternative, the repair information system could transmit or otherwise provide a computer-readable package to VRT, so that the VRT could display or otherwise output the computer-readable package (e.g., via user interface 130). In this case, the repair information system could transmit or otherwise provide a computer-readable package to VRT in response to a request from the VRT, among other options.

On this point, the repair information included in a package may include information associated with procedure(s) for repairing the vehicle, such as one or more of procedures 118, for instance. In practice, a given procedure may specify actions to be carried out for a given collision repair job and/or may include other information associated with that repair job, such as a diagram of a vehicle component, an image of a vehicle component, an indication of a location of vehicle component, and/or information about operation and/or configuration of a vehicle component, among numerous other examples.

III. Vehicle Collision Repairs and Estimates

Vehicle owners may depend on professional repair technicians and/or other individuals to service or repair the owner's vehicle, especially in the event of a collision by the vehicle. Often, a collision may cause extensive or unique damage to a vehicle, and thus a collision repair shop may service and/or repair the vehicle. Although collision repair shops might provide at least some of the same services and/or repairs that other types of repair shops might also provide (e.g., oil change or replacement of an air filter), collision repair shops tend to specialize in resolving issues that vehicles encounter due to a collision or another event that causes extensive or unique vehicle damage. For example, a collision repair shop may have specialized tools specifically designed to assist with resolution of such issues and/or may employ professional repair technicians that specialize in resolving such issues, among other possibilities.

When a collision repair shop services and/or repairs a vehicle following a collision by the vehicle, the collision repair shop may carry out various repair jobs. Such repair jobs may include replacement and/or repair of a vehicle bumper, vehicle fender, headlights, wheels, an engine, and/or other vehicle components. Other types of repair jobs may include vehicle dent repair, vehicle paint jobs, and/or scratch removal, among other examples.

Each repair job may take a certain amount of time to complete and may have associated costs. Such costs might be at least partially covered by an insurance provider in accordance with an insurance plan for a given vehicle or customer. As such, the collision repair shop may produce a collision estimate report and share the report with an insurance provider. The collision estimate report may include respective cost and/or time estimates for carrying out various vehicle repair jobs. Those estimates could include original estimates and/or revised estimates. Moreover, a collision estimate report could be computer-readable and can be thus arranged as a structured query language (SQL) file, an extensible markup language (XML) file, or some other type of computer-readable file or data structure.

To help facilitate this process, a collision repair shop may hire estimators to produce, track, and/or manage collision estimate reports. Typically, a collision repair shop may have a computing system that has estimating software installed thereon, and thus an estimator could rely on such estimating software to produce, track, and/or manage collision estimate reports. Examples of estimating software may include the CCC ONE® software product by CCC® Information Services Inc., the Mitchell® Estimating software product by Mitchell® International, Inc. and the Audatex® Estimating software product by Audatex® U.S., among others.

In some cases, the collision repair shop's computing system could engage in communication with a third-party estimating system associated with the estimating software installed on the computing system. The third-party estimating system could be third-party estimating system 144 shown in FIG. 1 and further described herein. In any case, the third-party estimating system could provide a cloud-based service or the like that may carry out operations based on input provided via the estimating software.

For instance, the computing system could display a GUI of the estimating software that includes interface controls for providing various types of input, and the third-party estimating system could generate estimate data based on input provided via the GUI. Such estimate data may represent a collision estimate report and may indicate cost and/or time estimates for carrying out each repair job, component identifiers of components being repaired and/or replaced, customer information, vehicle information, a repair order identifier, insurance provider and/or plan information, among other possibilities. Moreover, the third-party estimating system could remotely store estimate data on behalf of the collision repair shop and/or could provide estimate data to the computing system, such as in response to receiving, from the computing system and by way of the GUI, a request for certain information represented by estimate data. Once the computing system receives the requested information, the computing system could display the information via the GUI.

In other cases, however, generation of estimate data could occur at the collision repair shop's computing system. Namely, the computing system could have estimating software installed thereon and could display a GUI of the estimating software as discussed. And when input is provided via the GUI, the computing system could generate estimate data based on this input, such as in accordance with program instructions set forth by the estimating software. In turn, the computing system could store the generated estimate data at data storage device of the computing system, at another data storage device owned by the collision repair shop, and/or at a third-party data storage associated with the collision repair shop, among other options. Moreover, the computing system could display, via the GUI, information represented by estimate data, such as in response to submission of a request for such information via the GUI.

In any case, an estimator may use estimating software in various ways to produce a collision estimate report. For example, the estimator may identify components of the vehicle that need to be serviced and/or repaired, and may then enter, via the estimating software, respective component identifiers of those components. In some situations, the estimator may also enter, via the estimating software, respective time estimates for repairing and/or replacing each component, repair jobs to be completed, customer information, vehicle information, insurance provider and/or plan information, among others. Based on the entered information, the estimating software could determine cost estimates for various repair jobs. For instance, the estimating software could determine a cost estimate for a particular repair job based on a component to be repaired or replaced, an estimated time for repairing the component, and/or the terms of the insurance plan that provides coverage for the customer's vehicle. In other examples, however, the estimator might not rely on the estimating software to determine cost estimates and might instead manually enter cost estimates via the estimating software, perhaps in addition to entering at least some of the above-mentioned information. Other examples are also possible.

Furthermore, to facilitate repair of a given vehicle, the collision repair shop might rely on a system, such as system 100 described above, to generate a package of repair information indicating repair job(s) to be performed. In line with the discussion above, such a package may include procedure(s) for repairing the vehicle. As discussed, a given procedure may specify actions to be carried out for a given collision repair job and/or may include other information associated with that repair job, such as a diagram of a vehicle component, an image of a vehicle component, an indication of a location of vehicle component, and/or information about operation and/or configuration of a vehicle component, among numerous other examples.

Typically, collision repair shops might rely on individual(s) other than repair technicians to produce packages of repair information, and the repair technicians might then rely on those packages when engaging in vehicle repairs. This process can be advantageous, because repair technician(s) can focus on the challenging and time-consuming task of repairing a vehicle following a collision, rather than having to both produce a package of repair information for the vehicle and also repair the vehicle. Yet, this process could still have various drawbacks.

Specifically, collision repair shops often rely on estimators to produce packages of repair information. In this process, an estimator may first produce a collision estimate report as described above, and may then rely on that report to produce a package of repair information using a repair information system, such as using feature(s) of system 100, for instance. In doing so, the estimator may determine that a certain component is identified in the collision estimate report and may obtain, from the repair information system, procedure(s) associated with that component. This obtaining may involve printing information specified by the procedure(s), manually recording this information, and/or recording this information in a computing device, among other options. The estimator may repeat such actions respectively for each component (or at least some of the components) identified in the collision estimate report, so as to produce a package of repair information.

Although this process could produce a package of repair information that might help repair technician(s) remediate issues with a vehicle that encountered a collision, this process may still give rise to various challenges.

First of all, because an estimator would need to look up and obtain procedure(s) for one component at a time as discussed, this process can be time-consuming, especially when many components are identified in a collision estimate report.

Second of all, an estimator might encounter a mismatch in component identifiers, which could lead to various problems.

In particular, component identifiers used in collision estimate reports may be those assigned by developer(s) of estimating software and/or by insurance provider(s), and thus at least some of those component identifiers might be different from component identifiers assigned by original equipment manufacturers (OEMs). For example, an OEM might assign a component identifier of "REH49270" to identify a particular engine model. Whereas, the estimating software may identify this particular engine model using a component identifier of "XJW90".

Because of a mismatch in component identifiers, an estimator would have to ascertain which component identifiers in the repair information system correspond to component identifiers in a collision estimate report. To do so, the estimator might, among other actions, evaluate component names and/or descriptions associated with certain component identifiers in the repair information system, so as to figure out whether those component identifiers correspond to the component identifiers in the collision estimate report. However, the estimator might not have sufficient technical knowledge to carry out such an assessment, and thus may inadvertently produce a package including at least some incorrect repair information. And even if the estimator does have the technical knowledge, this assessment might still further prolong the process of producing a package.

Consequently, the process at issue may be time-consuming and/or error-prone, and it may become even more burdensome to deal with the challenges of this process as vehicle technology advances. For example, as new vehicle components are developed and/or existing vehicle component technology progresses, the extent of technical knowledge required to accurately carry out component assessments may increase, thereby making the process even more error-prone and/or time-consuming. Moreover, such advances in vehicle technology might cause vehicle to have even more components, which might lead to an increase in the number of component identifiers included in a given collision estimate report. As a result, an estimator may need to engage in even more component look ups, thereby making the process even more time-consuming. Other disadvantages are also possible.

IV. Generating Packages of Repair Information Based on Component Identifiers from Collision-Repair Estimates The present disclosure provides for technical advances in computerized generation of packages of repair information, which may help overcome the above-described challenges and may also have other advantages. According to the present disclosure, a computing system (e.g., computing system 102) could cause a display device to display a visual identifier of a particular collision-repair estimate (e.g., a collision estimate report), could receive input data indicating selection of that visual identifier, and could responsively instruct the display device to display visual indicators of vehicle components associated with the selected particular collision-repair estimate. Then, the computing system could receive input data indicating selection of at least some of those visual indicators, thereby indicating selection of certain vehicle components. Responsive to this, the computing system could automatically determine procedure(s) based on identifiers of the selected vehicle components, and could provide an output based on the determined procedure(s), such as by causing the display device to display those procedure(s), for instance.

Generally, the present disclosure could provide numerous advantages to collision repair shops. For example, because the computing system can visually indicate vehicle components associated with a particular collision-repair estimate and enables selection from among those components, the present disclosure could help an estimator avoid repeated component look ups and also avoid encountering a mismatch in component identifiers. In turn, this could help increase accuracy of packages of repair information and could help a collision repair shop save valuable time and resources. Moreover, because the computing system can automatically determine procedure(s) based on select vehicle components and can provide corresponding output, an estimator would no longer need to obtain procedure(s) for one component at a time and then compile those procedure(s) to produce a package of repair information, thereby further saving valuable time and resources. Other advantages are also possible.

The present disclosure describes several implementations. It should be understood that other implementations are also possible without departing from the scope of the present disclosure.

In a first implementation, a system is provided. The system can include a computing system having a display device, such as computing system 102, computing device 128, a laptop, desktop computer, mobile device, or the like.

In one case, the computing system could have stored thereon program instructions that are executable to carry out operations describe herein. In this case, collision repair shop(s) could purchase or otherwise obtain the computing system, so as gain the benefits of the present disclosure. In another case, a software product could include such program instructions and could be installed on the computing system to enable the computing system to carry out the operations at issue. As such, collision repair shop(s) could purchase or otherwise obtain the software product and could install the software product on their computing system(s). Other cases are also possible.

In a second implementation, another system is provided. The system can include a server computing system (e.g., computing system 102) and a client computing device (e.g., computing device 128). The server computing system could transmit, to the client computing device, a representation of a GUI window, and the client computing device could display this representation on a display device of the computing device. The GUI window could include visual elements in line with the present disclosure, such as a visual identifier of a particular collision-repair estimate, among others. Further, the server computing system could receive input data from the client computing device according to input provided at the client computing device via the GUI window, and the server computing system could responsively use the input data as basis to carry out certain operations in line with the present disclosure. For example, the server computing system could transmit, to the client computing device, another representation of a GUI window including other visual elements in line with the present disclosure, such as visual indicators of vehicle components, for instance. In another example, the server computing system could determine procedure(s) based on select vehicle components.

The second implementation could be facilitated in various ways. For example, a software product, computing device, and/or a cloud-based service or the like could enable server-client type communications and operations.

Specifically, a software product could be installed on the client computing device to enable communications between the server computing system and the client computing device and/or to enable the client computing device to display various GUI window(s) contemplated herein. In some situations, collision repair shop(s) could purchase or otherwise obtain the software product and could install the software product on their computing device(s). In other situations, collision repair shop(s) could purchase or otherwise obtain computing device(s) that already have the software product installed thereon. Other situations are also possible.

Additionally or alternatively, the server computing system could provide a cloud-based service or the like to the client computing device. The client computing device may be configured to execute a web browser (e.g., web browser 140). The web browser may include a web-display tool that provides for or otherwise supports display of information, such as information received from the server computing system. As such, an individual at a collision repair shop could utilize the client computing device to navigate to a particular website via the web browser, and perhaps to also set up and/or login to a user account at the particular website, so as to review estimate(s) and/or obtain package(s) of repair information for customer(s) of the collision repair shop, for instance. The particular website could display various GUI window(s) received from the server computing system, and the server computing system could receive input data in accordance with input provided via the particular website. Other implementations are also possible.

FIG. 2 is a flowchart illustrating a method 200, according to an example implementation. Method 200 shown in FIG. 2 (and other processes and methods disclosed herein) presents a method that can be implemented within an arrangement involving, for example, system 100, computing system 102, computing device 128, and/other another computing system or device (or more particularly by component(s) or subsystem(s) thereof, such as by a processor and a (e.g., non-transitory or transitory) computer-readable medium having instructions that are executable to cause the device to perform functions described herein). Additionally or alternatively, method 200 may be implemented within some other arrangement and system.

Method 200 and other processes and methods disclosed herein may include one or more operations, functions, or actions as illustrated by one or more of blocks 202-210. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the method 200 and other processes and methods disclosed herein, each block in FIG. 2 may represent circuitry that is wired to perform the specific logical functions in the process.

At block 202, method 200 involves determining, by a computing system, estimate data for a particular collision-repair estimate that specifies repair costs due to collision by a particular vehicle, where the estimate data specifies at least a plurality of component identifiers representative of a plurality of vehicle components of the particular vehicle, where the computing system has access to mapping data that maps each of a plurality of procedures to one or more respective component identifiers used in collision-repair estimates, and where each procedure includes information for repair of one or more vehicle components represented by the one or more respective component identifiers.

As noted above, component identifiers used in collision estimate reports might be different from component identifiers assigned by OEMs. In practice, a component identifier used in a collision estimate report could be a part number or the like that includes a set of alphanumeric characters to uniquely represent a certain vehicle component. Similarly, a component identifier assigned by OEMs could also be a part number or the like that includes a set of alphanumeric characters to uniquely represent a certain vehicle component. However, in many situations, a component identifier used in a collision estimate report to represent a particular vehicle component might be different from a component identifier assigned by an OEM to represent that same vehicle component. In line with the discussion above, such a mismatch in component identifiers could lead to various issues.

To help overcome those issues, the computing system could have stored thereon or otherwise have access to mapping data that maps each of a plurality of procedures to respective component identifier(s) used in collision-repair estimates, and the computing system could leverage the mapping data as described herein.

On this point, the mapping data could be arranged in various ways. For example, the mapping data could include direct respective mappings of procedure(s) to component identifier(s) used in collision-repair estimates. Additionally or alternatively, the mapping data could include multiple sets of mapping data, so as to set forth indirect respective mappings of procedure(s) to component identifier(s) used in collision-repair estimates. For instance, the mapping data may include first and second mapping data. The first mapping data could map (i) each of the plurality of procedures to (ii) respective component identifier(s) used in a repair information system that contains the plurality of procedures (e.g., computing system 102). And the second mapping data could then map (i) the respective component identifier(s) used in the repair information system to (ii) the respective component identifier(s) used in collision-repair estimates. For example, the second mapping data could map (i) a part number used in a collision estimate report to represent a particular vehicle component to (ii) a part number assigned by an OEM to represent the particular vehicle component. Other examples are also possible.

Given this, the computing system could use the mapping data to determine a procedure based on a component identifier used in collision-repair estimates and another procedure based on another component identifier used in collision-repair estimates, and so on. In this way, as further described herein, the computing system could provide an output that includes those determined procedures, and those procedures might help respectively resolving issues with vehicle components represented by the component identifiers. Such an output could be considered a package of repair information.

In some implementations, the mapping data could specify "component concept(s)" each respectively associating two or more component identifiers as being related, and the mapping data could map such component concept(s) respectively to certain procedure(s). By way of example, first and second component identifiers used in collision-repair estimates may respectively represent first and second vehicle components. If a specific procedure could help resolve issues respectively encountered by both the first and second vehicle components, then the first and second component identifiers could be considered as related to one another. Given this, a component concept could associate the first and second component identifiers as being related and could be mapped to the specific procedure. Thus, the computing system could use the mapping data to determine the specific procedure based on the first and second component identifiers, and could provide an output that includes the specific procedure.

In this way, rather than necessarily providing one or more procedures respectively for each component, the computing system could advantageously provide one procedure that might help resolve issues with multiple vehicle components, thereby helping a collision repair shop save valuable time and resources. Other advantages are also possible.

Figure 3:
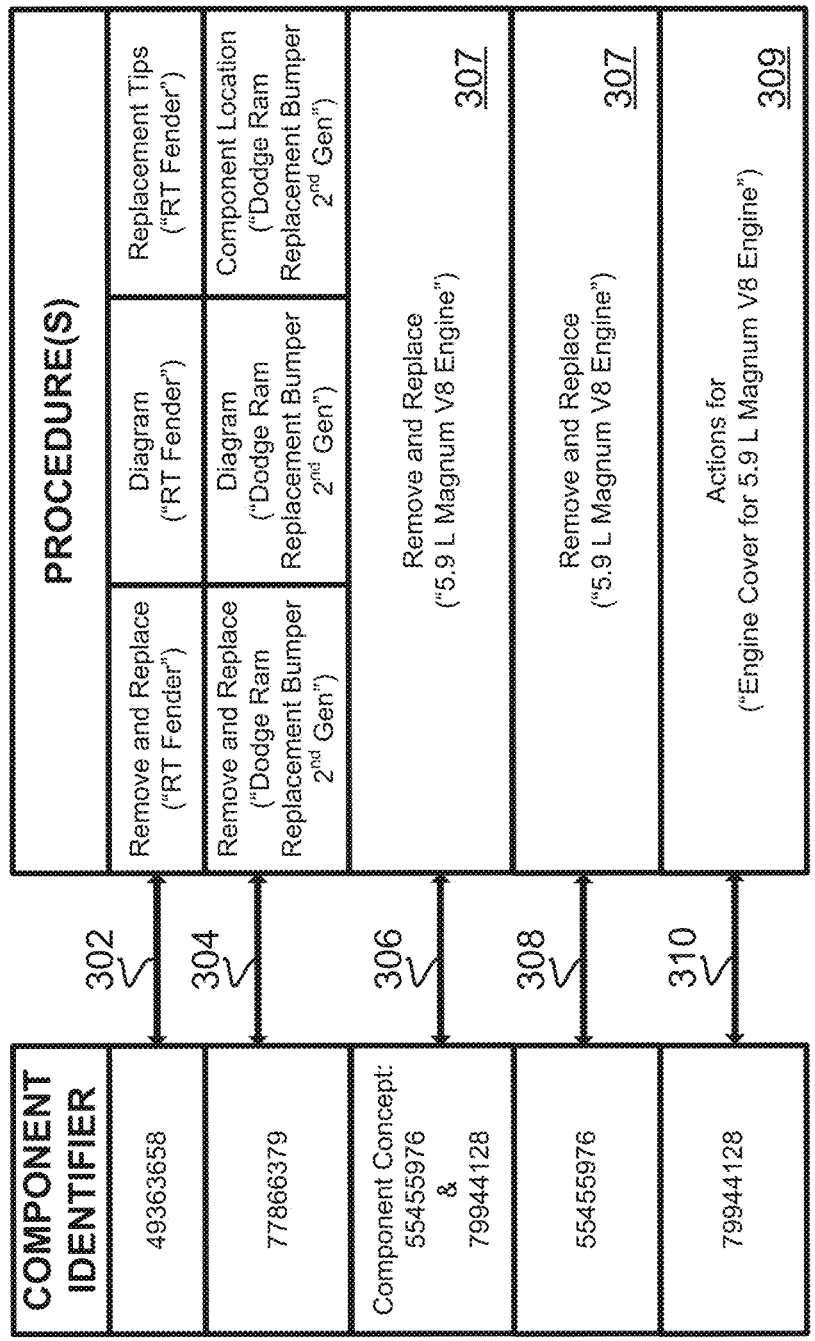
FIG. 3 illustrates mapping data in accordance with one or more example embodiments.

FIG. 3 next illustrates an example mapping data 300 that a data storage device (e.g. data storage device 112) may have stored thereon, in accordance with an example implementation. As shown, mapping data 300 illustrates a mapping 302 between component identifier "49363658" and procedures "remove and replace", "diagram", and "replacement tips". The component identifier "49363658" may represent vehicle component "RT Fender" and is mapped to procedures "remove and replace", "diagram", and "replacement tips" that may help remediate issue with that vehicle component. Also, mapping data 300 illustrates a mapping 304 between component identifier "77866379" and procedures "remove and replace", "diagram", and "component location". The component identifier "77866379" may represent vehicle component "Dodge Ram Replacement Bumper $2^{nd}$ Gen" and is mapped to procedures "remove and replace", "diagram", and "component location" that may help remediate issue with that vehicle component.

Further, component identifier "55455976" may represent a vehicle component "5.9 L Magnum V8 Engine", component identifier "79944128" may represent a vehicle component "Engine Cover for 5.9 L Magnum V8 Engine", and mapping data 300 shows that a component concept may associate those component identifiers as being related. Such a component concept may exist because procedure(s) for the "5.9 L Magnum V8 Engine" could already include action(s) with respect to the "Engine Cover for 5.9 L Magnum V8 Engine". As such, the mapping data 300 illustrates a mapping 306 between the component concept at issue and a procedure "remove and replace", which may include action(s) with respect to both "5.9 L Magnum V8 Engine" and "Engine Cover for 5.9 L Magnum V8 Engine". Other examples are also possible.

As noted, each procedure of the plurality of procedures may include information for repair of vehicle component(s) represented by respective component identifier(s). The computing system could have such procedures stored thereon (e.g., procedures 118 at data storage device 112) and/or could otherwise have access to such procedures. In any case, a given procedure might include various types of information to assist with repair of vehicle component(s).

By way of example, a given procedure may be or may otherwise include any one of the following: a listing of repair action(s) to be carried out with respect to certain vehicle component(s), an indication to replace certain vehicle component(s), a diagram associated with certain vehicle component(s), an image associated with certain vehicle component(s), an indication of respective location(s) in the particular vehicle of certain vehicle component(s), an indication of a respective relationship between certain vehicle component(s), information about operation of certain vehicle component(s), and/or information about configuration of certain vehicle component(s).

In other examples, a given procedure could involve automatic set up of a computing device (e.g., of a computing device 128 taking the form of a VRT) to perform operation(s) (e.g., a scan tool function) on a vehicle. Such operation(s) could be (i) a test during which the computing device communicates with the vehicle to request control of a vehicle component in the vehicle (and/or to analyze the vehicle component) and/or (ii) operation(s) that the computing device may carry out to calibrate certain vehicle component(s) in the vehicle, among others. In any case, automatic set up of the computing device could automatically cause the computing device to perform the operations. Alternatively, automatic set up of the computing device could automatically configure the computing device to be in a state in which the computing device is set to perform the operations upon a trigger to do so, such as upon receiving input providing such a trigger. For instance, the automatic set up could automatically configure the computing device to display a GUI window including an interface control (e.g, a "start" button) and a repair technician could engage that interface control to cause the computing device to perform the operation(s). In this way, the repair technician would not have to navigate through numerous GUI windows on the computing device so as to ultimately cause the computing device to perform the operation(s), thereby helping a repair shop save valuable time and resources. Other examples are also possible.

Furthermore, as noted, the computing system could determine estimate data for one or more collision-repair estimates. In line with the discussion above, the estimate data could represent a particular collision-repair repair estimate (e.g., a particular collision estimate report) and could therefore specify repair costs and/or other information in accordance with the particular collision-repair repair estimate. In some situations, the estimate data could also represent additional collision-repair repair estimate(s) (e.g., other collision estimate report(s)) and could therefore specify repair costs and/or other information in accordance with those additional collision-repair repair estimate(s). In any case, the estimate data could represent collision-repair repair estimate(s) associated with repair job(s) yet to be completed and/or collision-repair repair estimate(s) specifically requested by a collision repair shop, such as via the computing system or another device, among other possibilities.

On this point, the computing system could determine the estimate data in various ways. For example, the computing system could receive the estimate data from a data storage device. In specific examples, the computing system could retrieve estimate data from a data storage device of the computing system, from a data storage device owned by a collision repair shop, and/or from a third-party data storage provided by a third-party entity that remotely hosts data on behalf of a collision repair shop. In yet other examples, the computing system could receive estimate data from a third-party database of a third-party estimating system that hosts and/or generates estimate data on behalf of a collision repair shop. Other examples are also possible.

In an example implementation of this arrangement, the computing system at issue could take the form of a repair information system or the like, so as to help facilitate aspects of the presented disclosure. For example, FIG. 1 shows that computing system 102 could engage in communications with third-party estimating system 144 via network 104. Given this, computing system 102 could transmit, to the third-party estimating system 144, a request for certain estimate data, and could receive that estimate data from the third-party estimating system 144 in response to transmitting the request. In another example, FIG. 1 shows that data storage device 112 of computing system 102 contains (i) component identifiers 120 (e.g., used in collision-repair estimates), (ii) procedures 118 each respectively including various type(s) of information to assist with repair of vehicle component(s), (iii) mapping data 122 including mapping data that respectively maps one or more of the procedures 118 to one or more of the component identifiers 120 used in collision-repair estimates, and (iv) estimate data 124 that represents collision-repair repair estimate(s). Other implementations are also possible.

At block 204, method 200 involves, after determining the estimate data, transmitting, by the computing system to a display device, an instruction that causes the display device to display a visual identifier of the particular collision-repair estimate. In line with the discussion above, the display device could be a display device of the computing system or could be a display device of another computing device.

Specifically, the computing system could transmit, to the display device, an instruction to display a representation of a GUI window that is based on the determined estimate data. The representation may include at least a visual identifier of a particular collision-repair estimate represented by the estimate data. And if the estimate data also represents additional collision-repair repair estimate(s) as discussed above, then the representation at issue might also include respective visual identifiers of those additional collision-repair repair estimate(s).

In this regard, visual identifier(s) of collision-repair estimate(s) could take various forms. For example, a visual identifier for a given collision-repair estimate may represent: an identifier of the given collision-repair estimate (e.g., a set of alphanumeric characters uniquely assigned to the given collision-repair estimate), customer information (e.g., a name of a customer associated with the given collision-repair estimate), vehicle information (e.g., vehicle attributes and/or VIN number representing a particular vehicle associated with the given collision-repair estimate), and/or timing information (e.g., a date and/or a time that the given collision-repair estimate was established), among other possibilities.

Further, the representation could include interface control(s) that enable selection of certain visual identifier(s) of collision-repair estimate(s) via the GUI window. For example, the representation could include interface control(s) taking the form of graphical "select" button(s) each respectively positioned next to one of the visual identifier(s) so as to enable selection of the respective visual identifier. A given "select" button could be associated with a particular spatial location on the display device displaying the GUI window. If the particular spatial location is engaged (e.g., by touching a touch-sensitive display device at the particular spatial location), a selection of a visual identifier associated with the given "select" button can be determined. As such, input could be provided via the interface control(s) to select a particular visual identifier of a particular collision-repair estimate, and the computing system could in turn receive input data indicating such selection. Other examples are also possible.

At block 206, method 200 involves receiving input data indicative of selection of the visual identifier of the particular collision-repair estimate, and responsively instructing the display device to display visual indicators representative of the plurality of vehicle components.

As noted, the computing system could receive input data indicating selection of a particular visual identifier of a particular collision-repair estimate, thereby effectively indicating selection of the particular collision-repair estimate. In an example scenario, a user at a collision repair shop could use a computer mouse, a touch-sensitive display, and/or another input mechanism on a computing device to "click" on one of the above-mentioned "select" buttons, thereby causing the computing system to receive input data indicating the selection. In this way, the user could effectively initiate the process of generating a package of repair information based on component identifiers used in the particular collision-repair estimate.

Once the computing system receives the input data indicative of selection of the visual identifier of the particular collision-repair estimate, the computing system could responsively transmit, to the display device, an instruction to display a representation of a GUI window associated with the particular collision-repair estimate. This representation could include visual indicator(s) representative of vehicle component(s) associated with the particular collision-repair estimate. Namely, the estimate data may specify certain component identifier(s) in association with the particular collision-repair estimate, and those component identifier(s) may be of particular vehicle component(s). As such, the visual indicator(s) at issue might represent those particular vehicle component(s).

In this regard, visual indicator(s) of vehicle component(s) could take various forms. For example, a visual indicator for a given vehicle component may represent the component identifier of the given vehicle component, such as a part number and/or part name of the given vehicle component, among other possibilities.

Further, the representation that includes the visual indicator(s) could optionally also include other type(s) of information. For example, this representation might include an identifier of the particular collision-repair estimate, customer information associated with the particular collision-repair estimate, and/or vehicle information associated with the particular collision-repair estimate. In yet another example, this representation might include respective descriptions of vehicle component(s) represented by visual indicator(s). Other examples are also possible.

Yet further, the representation could include interface control(s) that enable selection of certain visual indicator(s) and that effectively trigger a search for procedure(s) based on component identifier(s) of vehicle component(s) represented by the selected visual indicator(s). For example, the representation could include interface control(s) taking the form of graphical checkbox respectively next to each visual indicator so as to enable selection of the respective visual indicator. Also, the representation could include an interface control taking the form of a "search" button that is selectable to trigger the search for procedure(s). In this way, input could be provided via the interface control(s) to effectively select vehicle component(s) for which procedure(s) should be determined, and the computing system could receive input data indicating such selection. Other examples are also possible.

At block 208, method 200 involves receiving, by the computing system, input data indicative of selection of one or more of the visual indicators representative of one or more selected vehicle components from among the plurality of vehicle components, and responsively determining, according to the mapping data, one or more particular procedures based on one or more particular component identifiers representative of the one or more selected vehicle components.

As noted, the computing system could receive input data indicating selection of certain visual indicator(s), thereby effectively indicating selection of vehicle component(s) for which procedure(s) should be determined. In an example scenario, a user at a collision repair shop could use an input mechanism on a computing device to "check" one or more of the above-mentioned checkboxes so as to select one or more vehicle components. Then, the user could "click" on the above-mentioned "search" button, thereby causing the computing system to receive input data effectively indicating the selected vehicle component(s) from the particular collision-repair estimate. Moreover, such actions could effectively initiate the process of the computing system determining procedure(s) to be included in a package of repair information.

Accordingly, once the computing system receives the input data indicative of selection of visual indicator(s) representative of select vehicle component(s), the computing system could responsively determine procedure(s) based on component identifier(s) of those select vehicle component(s). In this process, the computing system could determine the procedure(s) according to the above-described mapping data.

By way of example, the computing system could use the mapping data to determine one procedure based on a component identifier of a select vehicle component, and could also use the mapping data to determine two other procedures based on another component identifier of another select vehicle component.

In another example, the computing system could determine, according to a component concept specified in the mapping data, that a first component identifier of a select vehicle component is associated with a second component identifier of another select vehicle component. As discussed, such a component concept could be mapped to a specific procedure, and thus the computing system could use the mapping data to determine the specific procedure based on the first and second component identifiers. Other examples are also possible.

At block 210, method 200 involves providing, by the computing system, an output based on the one or more particular procedures. The output could be output 146 shown in FIG. 1 and provided by processor 106 (e.g., to user interface 108 and/or computing device 128), among other possibilities.

Once the computing system determines the procedure(s), the computing system could generate an output that includes at least some of those procedure(s). For example, the computing system could transmit, to the repair information system, a request for information associated with one or more of the determined procedure(s), and could then receive that information in response to the request. Or if the repair information system serves as the computing system at issue, then the repair information system could access its data storage device to obtain this information. In any case, the computing system could use, rearrange, and/or modify the information in any feasible manner, so as to generate the output. The output might include data that enables visual representation(s) of the procedure(s) and/or other types of representation(s).

In some implementations, the computing system could generate the output to include each determined procedure. In particular, the computing system could determine one or more procedures as described above and could then generate an output that includes each such procedure by default. Given this, a user at a collision repair shop could conveniently obtain a package of repair information in few steps. Namely, after the user engages in selection of a particular collision-repair estimate and then selection of component(s) as described above, the computing system could automatically determine the procedure(s) and then generate and provide the output, thereby helping the collision repair shop save valuable time and resources.

In other implementations, however, it may be beneficial to enable selection of which procedures are to be included in the output rather than necessarily include each determined procedure by default. In particular, the computing system could enable selection of one or more of the determined procedures and could then generate the output to include the selected procedures. Given this, a user at a collision repair shop could still conveniently obtain a package of repair information in few steps, but could also establish a more focused package that only includes procedures relevant to the user and/or to other individuals at the collision repair shop. Namely, after the user engages in selection of a particular collision-repair estimate, of component(s), and then of procedures(s), the computing system could automatically generate and provide the output, thereby helping the collision repair shop to improve its repair processes.

Generally, the computing system could facilitate in various ways the process of selecting procedure(s) to be included in the output. For example, assuming that the computing system determines multiple procedures according to the mapping data, the computing system could instruct the display device to display respective visual descriptors of those procedures. The computing system could then receive input data indicative of selection of one or more of the visual descriptors, thereby effectively indicating selection of certain procedure(s) represented by select visual descriptors. Consequently, the computing system could generate the output to include the selected procedures in accordance with the selection of the visual descriptors.

In a more specific example, the computing system could transmit, to the display device, an instruction to display a representation of a GUI window including interface control(s) that enable selection of visual descriptor(s) and that effectively trigger generation and providing of the output. For example, the representation could include interface control(s) taking the form of a graphical checkbox respectively next to each visual descriptor so as to enable selection of the respective visual descriptor. Also, the representation could include an interface control taking the form of "generate" button that is selectable to trigger generation and/or providing of the output including the select procedures. In this way, input could be provided via the interface control(s) to effectively select procedure(s) to be included in the output, and the computing system could receive input data indicating such selection and then proceed to generate and provide the output accordingly. Other examples are also possible.

Because the computing system generates the output to include procedure(s), the provided output could include various types of information. By way of example (and without limitation), the output could include or otherwise involve: a listing of repair actions to be carried out with respect to one or more of the selected vehicle components, an indication to replace one or more of the selected vehicle components, a diagram associated with one or more of the selected vehicle components, an image associated with one or more of the selected vehicle components, an indication of respective location(s) in the particular vehicle of one or more of the selected vehicle components, an indication of a respective relationship between at least one of the selected vehicle components and another vehicle component, information about operation of one or more of the selected vehicle components, information about configuration of one or more of the selected vehicle components, and/or automatic set up of a computing device to perform operation(s) on a vehicle (e.g., on one or more of the selected vehicle components). Other examples are also possible.

In some implementations, the computing system could generate the output to also include information from a VRT. For example, a repair technician at a collision repair shop might connect a VRT to the particular vehicle, and the VRT could obtain information from the vehicle and/or generate information according to a computerized analysis of the vehicle. In either case, the VRT could store such information as repair information associated with the particular vehicle, and could store such information locally and/or at the repair information system. Given this, the computing system could receive this repair information directly from the VRT and/or via the repair information system (e.g., if the repair information system doesn't serve as the computing system). In this process, when the computing system receives or otherwise refers to the VRT's repair information associated with the particular vehicle, the computing system could determine that this particular vehicle is associated with the particular collision-repair estimate that was selected, and the computing system could responsively include, in the output, at least some of this repair information.

Additionally or alternatively, the computing system could generate the output to also include other types of information. By way of example (and without limitation), the output could include: an identifier of the particular collision-repair estimate, customer information associated with the particular collision-repair estimate, vehicle information associated with the particular collision-repair estimate, and/or timing information associated with the particular collision-repair estimate. Other examples are also possible.

Once the computing system generates the output, the computing system could provide the output in one or more of various ways. By way of example (and without limitation), the computing system providing the output could involve: instructing the display device or another device to visually display the output, instructing a speaker to emit an audible representation of the output, instructing a printer to print the output, and/or storing the output in a data storage device, such as in a data storage device of the computing system, in a data storage device owned by a collision repair shop, in a third-party data storage provided by a third-party entity that remotely hosts data on behalf of a collision repair shop, and/or in a third-party database of a third-party estimating system. In yet other examples, providing the output could involve automatic set up of a computing device to perform operation(s) on a vehicle, in line with the discussion above. Other examples are also possible.

On this point, the computing system could optionally enable selection of the mechanism for providing the output. By way of example, the computing system could transmit, to the display device, an instruction to display a representation of a GUI window including interface control(s) that enable selection of an output mechanism and that effectively trigger providing of the output. For instance, the representation could include interface control(s) taking the form of a button respectively for each output mechanism, such as one button presentative of instructing the display device or another device to visually display the output, another button representative of printing the output, and yet another button representative of storing the output in a data storage device. In this way, input could be provided via the interface control(s) to effectively select the output mechanism, and the computing system could provide the output accordingly to this selection. Other examples are also possible.

FIGS. 4A, 4B, 4C, and 4D next respectively depict example GUI windows in accordance with the present disclosure. Although the GUI windows are shown to include certain visual elements, it should be understood that such GUI windows could be depicted and/or otherwise arranged in various ways without departing from the scope of the present disclosure.

Figure 4A:
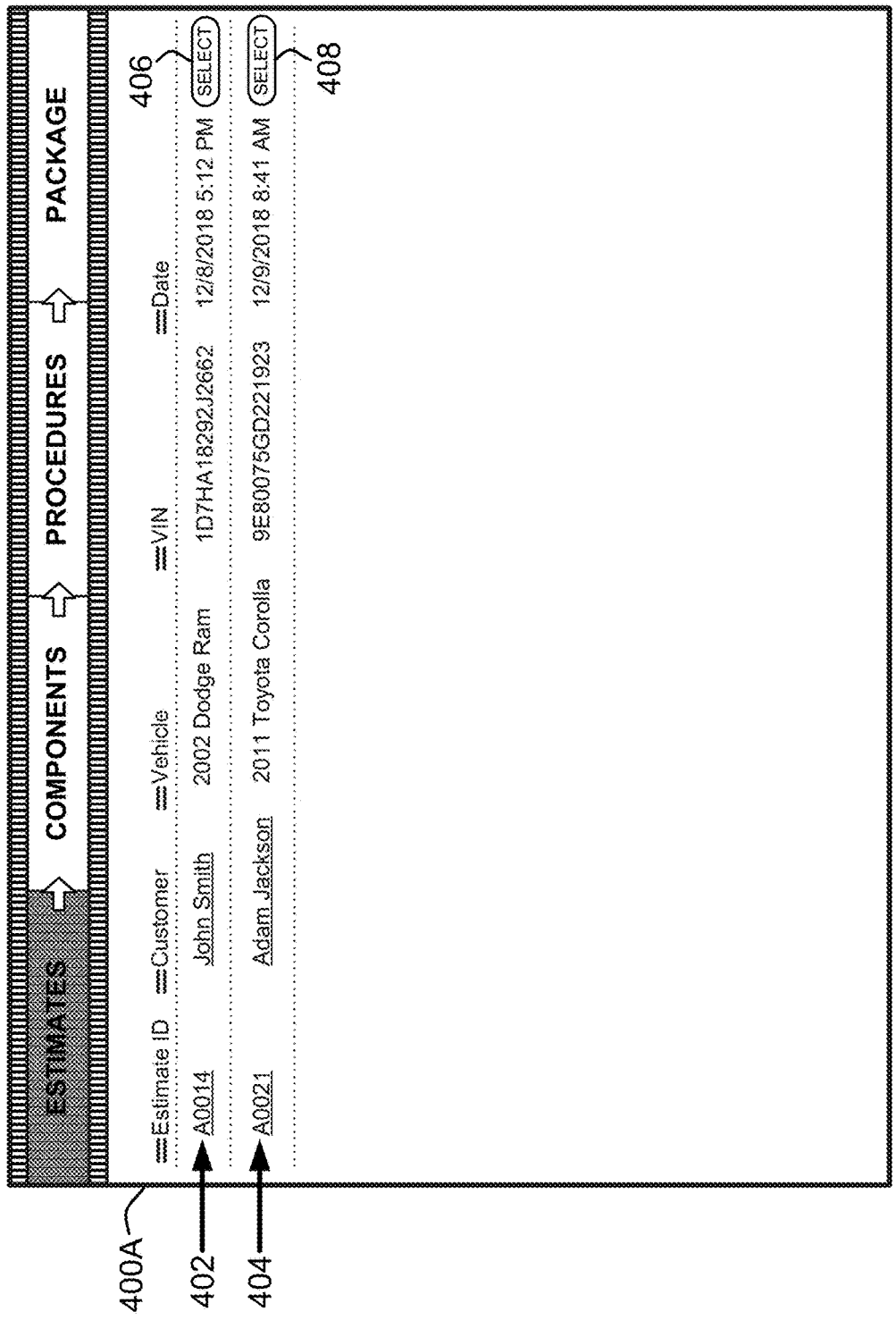
FIG. 4A illustrates a GUI window that enables selection of a collision-repair estimate, in accordance with one or more example embodiments.

FIG. 4A illustrates a GUI window 400A that includes a visual identifier 402, a visual identifier 404, interface control 406, and interface control 408. As an initial matter, visual identifier 402 represents an estimate identifier, customer information, vehicle information, and timing information for a first collision-repair estimate. On the other hand, visual identifier 404 represents an estimate identifier, customer information, vehicle information, and timing information for a second collision-repair estimate. Furthermore, interface control 406 takes the form of a graphical "select" button that enables selection of the first collision-repair estimate and interface control 408 takes the form of a graphical "select" button that enables selection of the second collision-repair estimate.

FIG. 4B illustrates a GUI window 400B that could be displayed following selection of the first collision-repair estimate via interface control 406. GUI window 400B includes a section 410 with a visual representation of the estimate identifier of the first collision-repair estimate, as well as another section 412 with respective visual representation of the customer information and vehicle information for the first collision-repair estimate. Further, GUI window 400B includes a section 414 having (i) visual indicators 420, 421 of vehicle components associated first collision-repair estimate, (ii) checkboxes 416A, 416B, and 416O to enable selection of vehicle components, and (iii) a "search" button 418 that is selectable to trigger the search for procedure(s). The visual indicators 420 include part numbers and the visual indicators 421 include part names. As shown in FIG. 4B, a user "checked" checkboxes 416A and 416C so as to select the vehicle component "RT Fender" and "Dodge Ram Replacement Bumper $2^{nd}$ Gen".

Figure 4C:
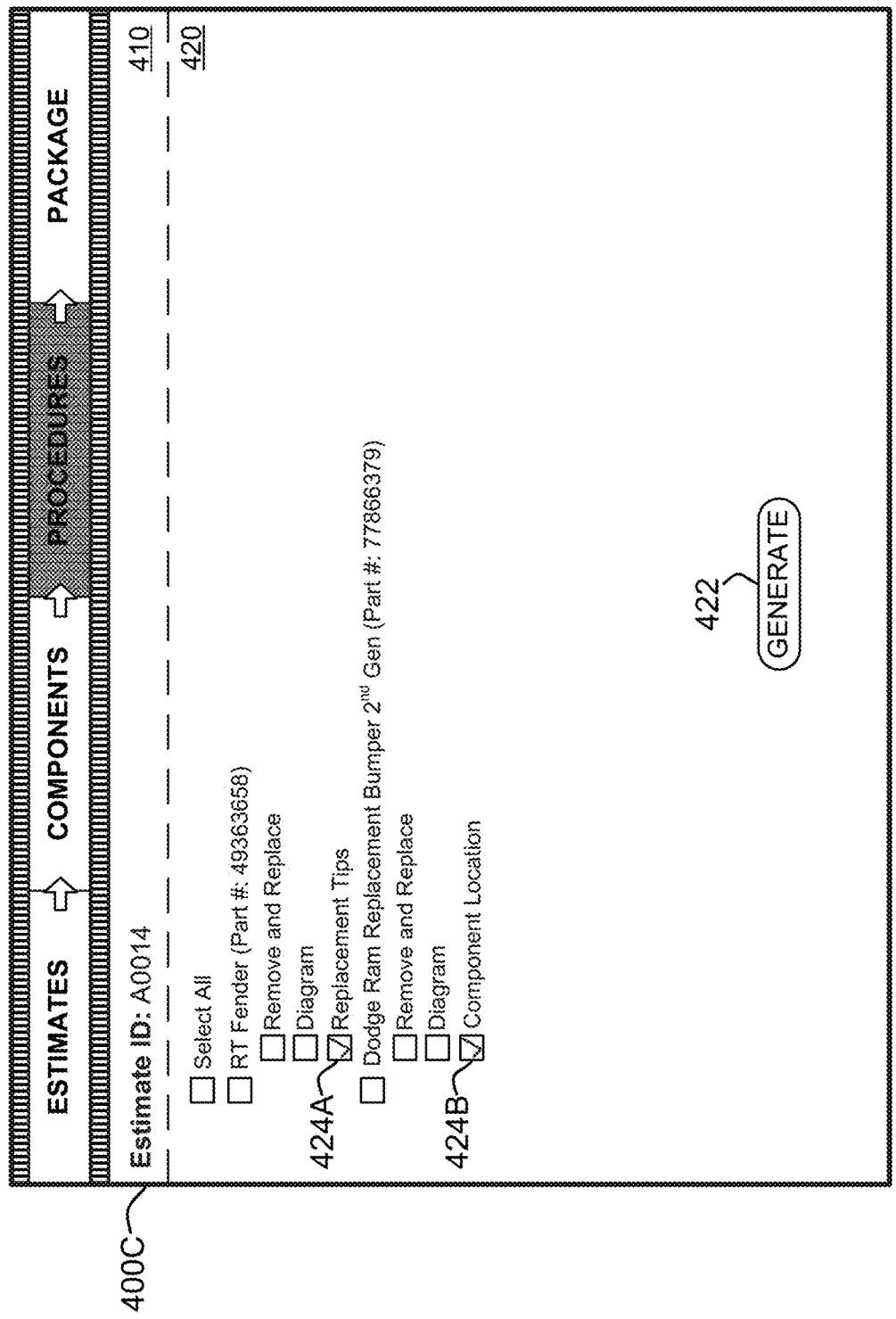
FIG. 4C illustrates a GUI window that enables selection of procedure(s) determined based on component identifier(s) of the selected vehicle component(s), in accordance with one or more example embodiments.

FIG. 4C illustrates a GUI window 400C that includes visual descriptors of procedure that are determined in accordance with the selection of vehicle components described with respect to FIG. 4B. In particular, GUI window 400C still includes the section 410 with the visual representation of the estimate identifier of the selected first collision-repair estimate. Also, GUI window 400C includes interface control(s) taking the form of a graphical checkbox respectively next to each visual descriptor so as to enable selection of the respective visual descriptor. Further, GUI window 400C includes an interface control taking the form of a "generate" button 422 that is selectable to trigger generation and/or providing of the output including the select procedures. As shown in FIG. 4C, a user "checked" checkboxes 424A and 424B so as to select the procedure of "Replacement Tips" for "RT Fender" as well as the procedure of "Component Location" for "Dodge Ram Replacement Bumper $2^{nd}$ Gen".

Figure 4D:
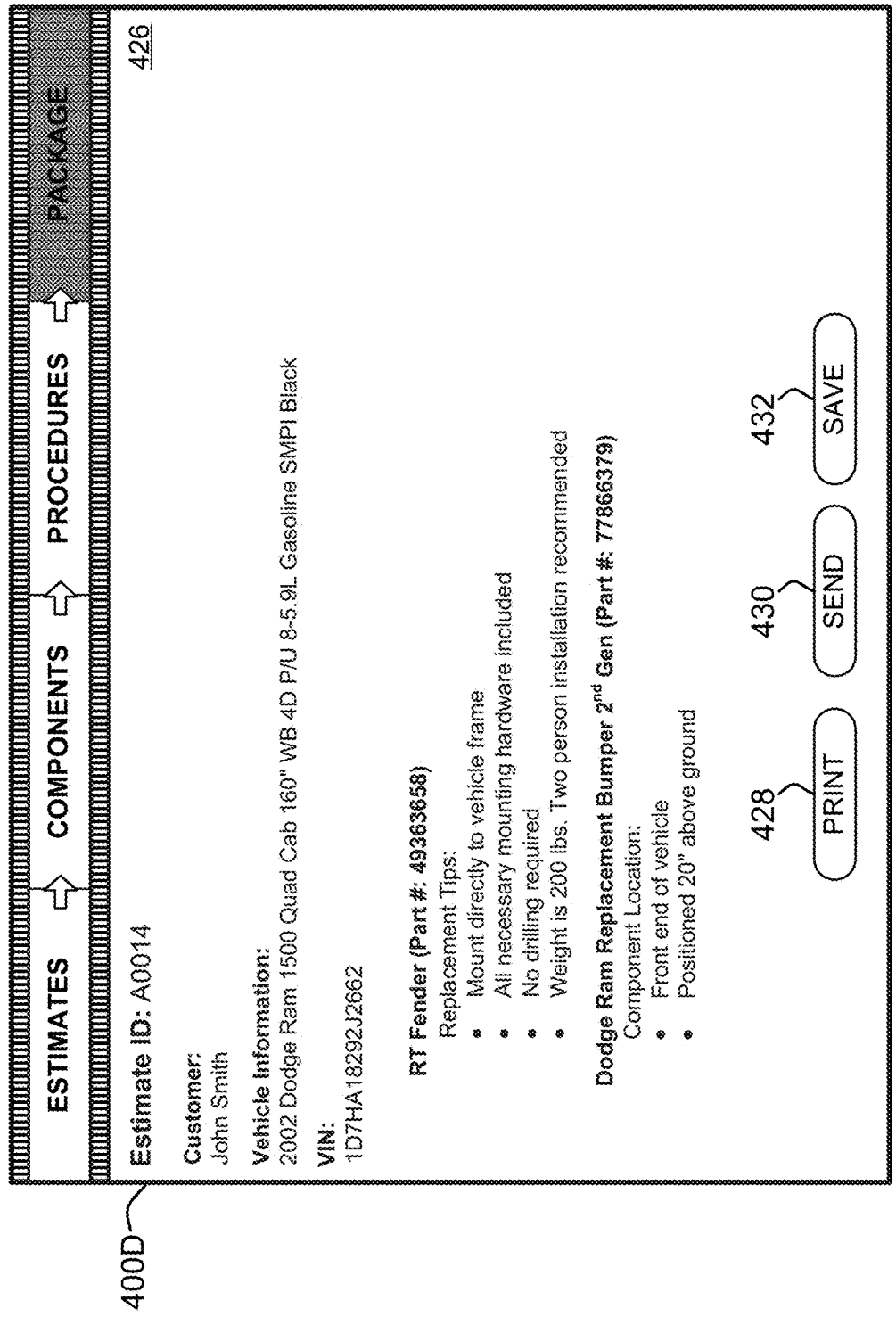
FIG. 4D illustrates a GUI window that includes information associated with the selected procedure(s), in accordance with one or more example embodiments.

FIG. 4D illustrates a GUI window 400D including an output that is based on the procedures selected described with respect to FIG. 4C. In particular, GUI window 400D includes a section 426 representing the estimate identifier, customer information, and vehicle information for the selected first collision-repair estimate. Also, section 426 includes information of the selected "Replacement Tips" procedure as well as information of the selected "Component Location" procedure. Further, GUI window 400D includes interface controls taking the form of (i) a button 428 selectable to cause printing the output, (ii) a button 430 selectable to cause transmission of the output to another device (e.g., a VRT), and (iii) a button 432 selectable to cause storing of the output in a data storage device. In this way, a user could conveniently and easily produce an accurate package of repair information based on a collision-repair estimate. Other illustrations are also possible.

V. Generating Packages of Repair Information Based on Various Component Identifiers As noted, the present disclosure provides for technical advances in computerized generation of packages of repair information. According to the present disclosure, a computing system (e.g., computing system 102) could generate and provide package(s) of repair information based on component identifiers as a general matter. Those component identifiers could include component identifiers used in collision estimate reports and/or component identifiers assigned by OEMs, among other possibilities. In any case, the computing system could receive a request indicating particular component identifier(s), could automatically determine procedure(s) based on the particular component identifier(s), could generate a reply to the request that include information from those procedure(s), and could output the generated reply to the request.

Generally, such an approach for computerized generation of packages of repair information could provide various advantages to all types of repair shops. For example, an individual at a repair shop could submit a request for repair information, the request including one or more component identifiers. And the computing system could automatically provide an output including relevant procedure(s) that might help remediate issues with vehicle component(s) represented by the component identifier(s). Without the disclosed approach, the individual might need to navigate on a computing device through a complex directory folders, files, and/or GUI windows so as to find relevant repair information, which could be a time-consuming and/or error-prone process. Other advantages are also possible.

The present disclosure describes several implementations of this approach. It should be understood that other implementations are also possible without departing from the scope of the present disclosure.

In a first implementation, a system is provided. The system can include a computing system having a display device, such as computing system 102, computing device 128, a laptop, desktop computer, mobile device, or the like. In one case, the computing system could have stored thereon program instructions that are executable to carry out operations describe herein. In this case, repair shop(s) could purchase or otherwise obtain the computing system, so as gain the benefits of the present disclosure. In another case, a software product could include such program instructions and could be installed on the computing system to enable the computing system to carry out the operations at issue. As such, repair shop(s) could purchase or otherwise obtain the software product and could install the software product on their computing system(s). Other cases are also possible.

In a second implementation, another system is provided. The system can include a server computing system (e.g., computing system 102) and a client computing device (e.g., computing device 128). The server computing system could transmit, to the client computing device, a representation of a GUI window, and the client computing device could display this representation on a display device of the computing device. The GUI window could include visual elements in line with the present disclosure, such as interface control(s) that enable entry of component identifier(s), among others. Further, the server computing system could receive input data from the client computing device according to input provided at the client computing device via the GUI window, and the server computing system could responsively use the input data as basis to carry out certain operations in line with the present disclosure. For example, the server computing system could transmit, to the client computing device, another representation of a GUI window including other visual elements in line with the present disclosure, such as a visual representation of information associated with procedure(s), for instance.

The second implementation could be facilitated in various ways. For example, a software product, computing device, and/or a cloud-based service or the like could enable server-client type communications and operations, in line with the discussion above.

FIG. 5 is a flowchart illustrating a method 500, according to an example implementation of the approach at issue. In line with the discussion above, method 500 shown in FIG. 5 presents a method that can be implemented within an arrangement involving, for example, system 100, computing system 102, computing device 128, and/or other another computing system or device (or more particularly by component(s) or subsystem(s) thereof, such as by a processor and a (e.g., non-transitory or transitory) computer-readable medium having instructions that are executable to cause the device to perform functions described herein). Additionally or alternatively, method 500 may be implemented within some other arrangement and system.

At block 502, method 500 involves receiving, by a computing system, a request indicating one or more particular component identifiers, where the computing system has access to mapping data that maps each of a plurality of procedures to one or more respective component identifiers, and where each procedure specifies information for repair of one or more vehicle components represented by the one or more respective component identifiers.

To help facilitate the disclosed approach, the computing system could have stored thereon or otherwise have access to mapping data (e.g., mapping data 300) that maps each of each of a plurality of procedures to one or more respective component identifiers. In practice, this mapping data could be part of the above-mentioned mapping data 122 and/or could be contained in any other feasible data storage device.

On this point, the mapping data could set forth respective mappings for any feasible component identifiers. For instance, as noted, the component identifiers could include component identifiers used in collision estimate reports and/or component identifiers assigned by OEMs, among others. As such, a given component identifier could be a part number or the like that includes a set of alphanumeric characters to uniquely represent a certain vehicle component.

Additionally, the mapping data could set forth respective mappings for any feasible procedures. In line with the discussion above, a given procedure may be or may otherwise include any one of the following: a listing of repair action(s) to be carried out with respect to certain vehicle component(s), an indication to replace certain vehicle component(s), a diagram associated with certain vehicle component(s), an image associated with certain vehicle component(s), an indication of respective location(s) in the particular vehicle of certain vehicle component(s), an indication of a respective relationship between certain vehicle component(s), information about operation of certain vehicle component(s), information about configuration of certain vehicle component(s), and/or automatic set up of a computing device to perform operation(s) on a vehicle. Other examples are also possible.

Further, the mapping data could be arranged in various ways. In line with the discussion above, the mapping data could include direct respective mappings of procedure(s) to component identifier(s). Additionally or alternatively, the mapping data could include multiple sets of mapping data, so as to set forth indirect respective mappings of procedure(s) to component identifier(s). Moreover, in some implementations, the mapping data could specify component concept(s) each respectively associating component identifiers as being related, and the mapping data could map such component concept(s) respectively to certain procedure(s).

In some implementations, the computing system could also have stored thereon or otherwise have access to a component taxonomy that establishes relationships between different versions of components identifiers. In practice, this component taxonomy could be component taxonomy 126 shown in FIG. 1 or could be contained in any other feasible data storage device. Moreover, this component taxonomy could be separate from the mapping data and/or could be combined or otherwise integrated with the mapping data in any feasible manner.

More specifically, an entity might assign a particular component identifier to a particular vehicle component, but this component identifier could be represented according to various versions. For example, an OEM could assign a component identifier of "1L4-9AG-617" to a particular vehicle component (e.g., a particular engine model). However, repair technician(s) and/or other individual(s) might refer to a different version of this component identifier, such as to a version that include spaces between one or more of the alphanumeric characters (e.g., "1L4 9AG 617") and/or to a version without any hyphens or spaces between one or more of the alphanumeric characters (e.g., "1L49AG617"), among others. Thus, repair technician(s) and/or other individual(s) might submit a request (i.e., in accordance with the disclosed approach) including a version of a component identifier that is different from a version established by the entity or is otherwise different from the version mapped in the mapping data.

To help overcome this challenge, the computing system could leverage the component taxonomy in combination with the mapping data. In particular, the component taxonomy may associate multiple versions of a given component identifier as being related, and may associated multiple versions of another component identifier as being related, as so on. Given this, if the computing system receives a request including a first version of a particular component identifier (e.g., "1L49AG617"), the computing system could use the component taxonomy to determine that the first version is associated with a second version of a particular component identifier (e.g., "1L4-9AG-617"), the second version being the one for which a mapping is established in the mapping data. In turn, the computing system could use the mapping data to determine procedure(s) based on the second version of the particular component identifier, thereby enabling determination of procedure(s) under various circumstances.

In a further aspect, the computing system could be configured to resolve a situation where different OEMs assigned the same component identifier to different components (e.g., components of different types or components of the same type that are made by different OEMs). To help overcome this situation, the computing system could also have stored thereon or otherwise have access to information about OEMs respectively associated with one or more of the component identifiers as well as to information about particular components respectively included in various vehicles. Given this information, if the computing system receives a request indicating a particular component identifier and determines that the mapping data includes multiple instances of that component identifier (i.e., each instance respectively associated with a different OEM), the computing system could determine the correct instance of the component identifier based on information about components included in a vehicle being serviced.

For example, if the request include a particular component identifier and there are multiple instance of that component identifier in the mapping data, the computing system could use the information at issue to determine that the vehicle being serviced includes a particular component that has been assigned that component identifier by a particular OEM. And the computing system could then use that particular OEM to ascertain which instance of the component identifier is the correct instance to be used for determination of procedure(s) as further described herein. In practice, the computing system could determine the vehicle being service based on information received from a VRT or based on information provide via a GUI displayed by a display device, among other options. Other examples are also possible.

Given this arrangement, as noted above, the computing system could receive a request indicating particular component identifier(s). To facilitate this, the computing system could transmit, to the display device, an instruction to display a representation of a GUI window including interface control(s) that enable submission of the request. For example, the representation could include search field(s) that enable entry of one or more alphanumeric characters representative of one or more component identifiers. Additionally, the representation could include a "search" button that, if selected, triggers submission of a request including component identifier(s) represented by characters entered in the search field(s). In this way, input could be provided via the interface control(s) to submit a request including component identifier(s), and the computing system could in turn receive this request. Other examples are also possible.

At block 504, method 500 involves, in response to receiving the request, determining, by the computing system and according to the mapping data, one or more particular procedures based on the one or more particular component identifiers.

As noted, the computing system could receive a request including component identifier(s), which effectively amount to a request for procedure(s) that might remediate issues with vehicle component(s) represented by those component identifier(s). In an example scenario, a user at a repair shop could enter via the above-mentioned search field(s) characters representative of component identifier(s) and could then trigger a request including those component identifier(s), such as by "clicking" on the above-mentioned "search" button, among other options. In practice, such actions could effectively initiate the process of the computing system determining procedure(s) to be included in a package of repair information.

Accordingly, once the computing system receives the request including component identifier(s), the computing system could responsively determine procedure(s) based on component identifier(s). In this process, the computing system could determine the procedure(s) according to the above-described mapping data.

By way of example, the computing system could use the mapping data to determine one procedure based on one component identifier included in the request, and could also use the mapping data to determine four other procedures based on another component identifier included in the request.

In another example, the computing system could determine, according to a component concept specified in the mapping data, that a first component identifier included in the request is associated with a second component identifier also included in the request. Here again, such a component concept could be mapped to a specific procedure, and thus the computing system could use the mapping data to determine the specific procedure based on the first and second component identifiers.

In yet another example, the request may include a certain version of a component identifier, and the computing system may refer to the component taxonomy to determine that that this version is associated with another version of that component identifier. In turn, the computing system could use the mapping data to determine several procedures based on the other version at issue. Other examples are also possible.

At block 506, method 500 involves generating, by the computing system, a reply to the request that includes information from the one or more particular procedures.

Once the computing system determines the procedure(s), the computing system could generate a reply that includes at least some of those procedure(s). In line with the discussion above, the computing system could retrieve, from a data storage device of a repair information system, information associated with one or more of the determined procedure(s). Once retrieved, the computing system could use, rearrange, and/or modify the information in any feasible manner, so as to generate the reply. The reply might include data that enables visual representation(s) of the procedure(s) and/or other types of representation(s).

In some implementations, the computing system could generate the reply to include each determined procedure. In particular, the computing system could determine procedure(s) as described above and could then generate a reply that includes each such procedure by default. Given this, a user at a repair shop could conveniently obtain a package of repair information in just one step. Namely, after the user engages in entry of component identifier(s) as described above, the computing system could automatically determine the procedure(s) and then generate and provide the reply, thereby helping the repair shop save valuable time and resources.

In other implementations, however, it may be beneficial to enable selection of which procedures are to be included in the reply. In particular, the computing system could enable selection of one or more of the determined procedures and could then generate the reply to include the selected procedures. In practice, the computing system could facilitate such selection using the same or similar techniques to those described above in the context of selecting procedure(s) to be included in an output, or the computing system could so in other ways. In any case, here again, a user at a repair shop could still conveniently obtain a package of repair information in few steps, but could also establish a more focused package that only includes procedures relevant to the user and/or to other individuals at the repair shop. Namely, after the user after the user engages in entry of component identifier(s) and then in selection of procedures(s), the computing system could automatically generate and provide the reply, thereby helping the collision repair shop to improve its repair processes.

Because the computing system generates the reply to include procedure(s), the reply could include various types of information. By way of example (and without limitation), assuming that the component identifier(s) included in the request represent particular vehicle component(s), the reply could include or otherwise involve: a listing of repair action(s) to be carried out with respect to one or more of the particular vehicle component(s), an indication to replace one or more of the particular vehicle component(s), a diagram associated with one or more of the particular vehicle component(s), an image associated with one or more of the particular vehicle component(s), an indication of respective location(s) in the particular vehicle of one or more of the particular vehicle component(s), an indication of a respective relationship between at least one of the particular vehicle component(s) and another vehicle component, information about operation of one or more of the particular vehicle component(s), information about configuration of one or more of the particular vehicle component(s) and/or automatic set up of a computing device to perform operation(s) on a vehicle. (e.g., on one or more of the particular vehicle component(s)). Other examples are also possible.

Additionally or alternatively, the computing system could generate the reply to also include other types of information. For example, one of the component identifier(s) included in the request may represent a vehicle component uniquely established for a particular vehicle or for a set of vehicles that have common vehicle attribute(s). Given this, the computing system could generate the reply to include information about the particular vehicle or about vehicle(s) of the set. The computing system could retrieve such information from a repair information system, among other options. Other examples are also possible.

At block 508, method 500 involves outputting, by the computing system, the generated reply to the request. The output could be output 146 shown in FIG. 1 and provided by processor 106 (e.g., to user interface 108 and/or computing device 128), among other possibilities.

Once the computing system generates the reply the computing system could output the reply in one or more of various ways.

By way of example (and without limitation), the computing system outputting the reply could involve: instructing the display device or another device to visually display the reply, instructing a speaker to emit an audible representation of the reply, instructing a printer to print the reply, and/or storing the reply in a data storage device, such as in one or more of the above-described data storage devices, for instance.

In a more specific example, the computing system could receive request from a computing device displaying a GUI (e.g., a first GUI window) that enables submission of the request, and the computing system could then transmit the generated reply to that computing device, such as by causing the computing device to visually display, on the GUI (e.g., in a second GUI window), at least some of the information from the determine procedure(s). Other examples are also possible.

On this point, the computing system could optionally enable selection of the mechanism for providing the reply. In practice, the computing system could facilitate this using the same or similar techniques to those described above in the context of selection of a mechanism for providing an output, or the computing system could so in other ways.

Figure 6A:
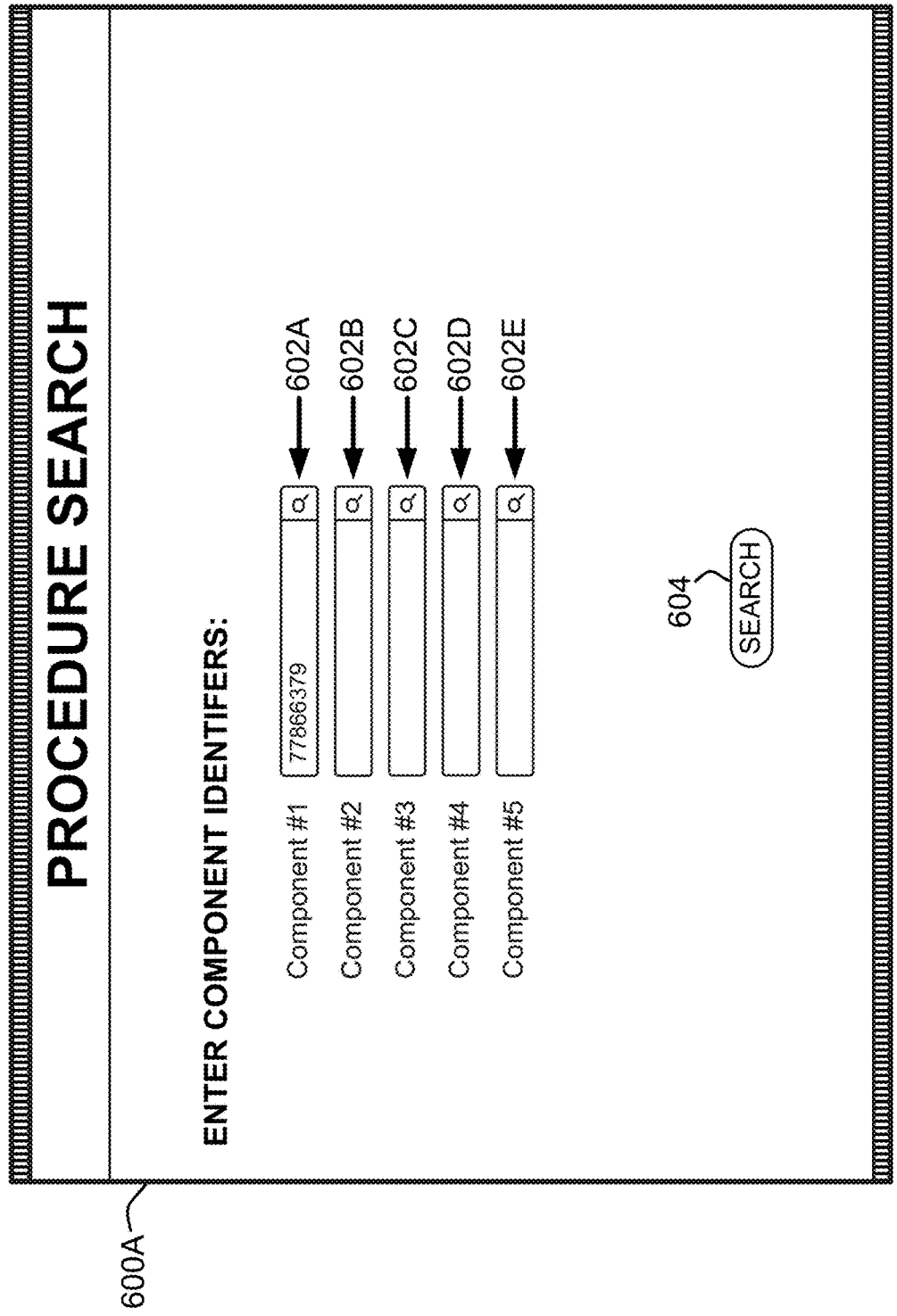
FIG. 6A illustrates a GUI window that enables submission of a request including one or more component identifiers, in accordance with one or more example embodiments.
Figure 6B:
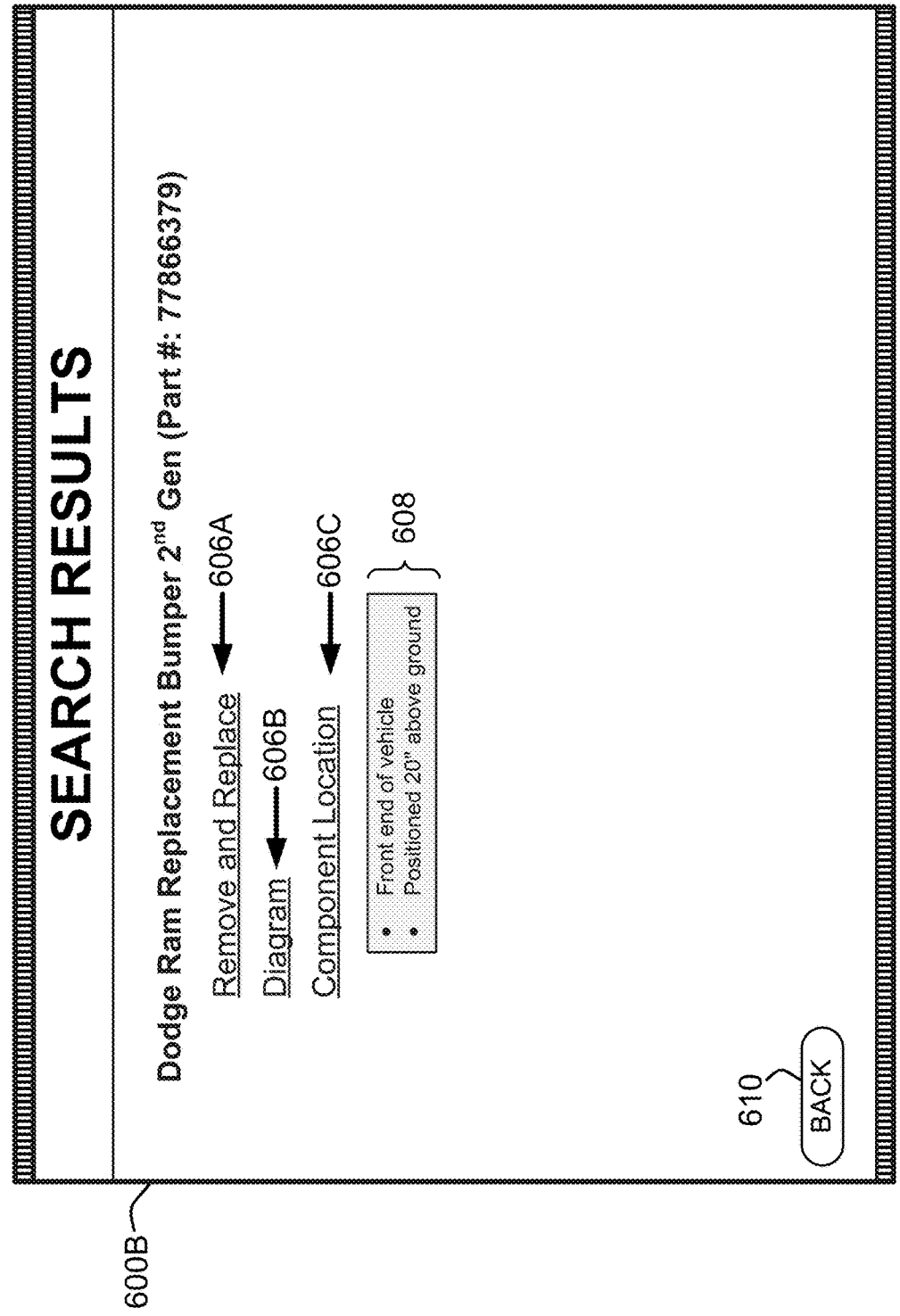
FIG. 6B illustrates a GUI window including a reply to the request, in accordance with one or more example embodiments.

FIGS. 6A to 6B next respectively depict example GUI windows in accordance with the present disclosure. Although the GUI windows are shown to include certain visual elements, it should be understood that such GUI windows could be depicted and/or otherwise arranged in various ways without departing from the scope of the present disclosure.

FIG. 6A illustrates a GUI window 600A including search fields 602A, 602B, 602C, 602D, and 602E as well as a search button 604. Search fields 602A, 602B, 602C, 902D, and 602E each respectively enable entry of one or more alphanumeric characters representative of a component identifier. And search button 604 is configured triggers submission of a request including component identifier(s) represented by characters entered in the search field(s). By way of example, FIG. 6A shows that a component identifier of "77866379" in search field 602A. As such, selection of the search button 604 would trigger submission of a request including this component identifier "77866379", so that the computing system could responsively determine procedure(s) based on this component identifier and then generate and output a reply including the determined procedure(s).

FIG. 6B illustrates a GUI window 600B including an example reply to the request submitted as discussed in the context of FIG. 6A. In particular, GUI window 600B includes a name of the vehicle component (e.g., "Dodge Ram Replacement Bumper $2^{nd}$ Gen") associated with the component identifier included in the request (e.g., "77866379"). Also, GUI window 600B includes links 606A, 606B, and 606C representative of procedures determined based on the component identifier at issue. Each such link is respectively selectable so as to cause display of information associated with the procedure represented by the link. For instance, FIG. 6B illustrates that selection of link 606C causes display, within GUI window 600B, of a dialog box 608 including information of the selected "Component Location" procedure. Moreover, GUI window 600B includes a "back" button 610 that, if selected, triggers return to the GUI window 600A, such as for purposes of submission additional requests, for instance. Other illustrations are also possible.

VI. Conclusion

Example embodiments have been described above. Those skilled in the art will understand that changes and modifications can be made to the described embodiments without departing from the true scope of the present invention, which is defined by the claims.

Additional embodiments, based on the features or functions described herein, can be embodied as a computer-readable medium storing program instructions, that when executed by a processor cause a set of functions to be performed, the set of functions comprising the features or functions of the aspects and embodiments described herein.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Embodiments of the present disclosure may thus relate to one of the enumerated example embodiments (EEEs) listed below.

EEE 1 is a method comprising: determining, by a computing system, estimate data for a particular collision-repair estimate that specifies repair costs due to collision by a particular vehicle, wherein the estimate data specifies at least a plurality of component identifiers representative of a plurality of vehicle components of the particular vehicle, wherein the computing system has access to mapping data that maps each of a plurality of procedures to one or more respective component identifiers used in collision-repair estimates, and wherein each procedure includes information for repair of one or more vehicle components represented by the one or more respective component identifiers; after determining the estimate data, transmitting, by the computing system to a display device, an instruction that causes the display device to display a visual identifier of the particular collision-repair estimate; receiving, by the computing system, input data indicative of selection of the visual identifier of the particular collision-repair estimate, and responsively instructing the display device to display visual indicators representative of the plurality of vehicle components; receiving, by the computing system, input data indicative of selection of one or more of the visual indicators representative of one or more selected vehicle components from among the plurality of vehicle components, and responsively determining, according to the mapping data, one or more particular procedures based on one or more particular component identifiers representative of the one or more selected vehicle components; and providing, by the computing system, an output based on the one or more particular procedures.

EEE 2 is the method of EEE 1, wherein determining the estimate data comprises receiving the estimate data from a data storage device of a collision-repair entity assigned to carry out repairs due to collision by the particular vehicle.

EEE 3 is the method of EEE 1, wherein determining the estimate data comprises receiving the estimate data from a third-party database associated with a third-party estimating system that generated the estimate data.

EEE 4 is the method of any one of EEE 1 to 3, wherein the mapping data comprises first and second mapping data, wherein the first mapping data maps (i) each of the plurality of procedures to (ii) one or more respective component identifiers used in a repair information system that contains the plurality of procedures, and wherein the second mapping data further maps (i) the one or more respective component identifiers used in the repair information system to (ii) the one or more respective component identifiers used in collision-repair estimates.

EEE 5 is the method of any one of EEE 1 to 4, wherein the mapping data specifies a component concept that associates at least first and second component identifiers as being related, and wherein the mapping data maps the component concept to a specific procedure of the plurality of procedures.

EEE 6 is the method of EEE 5, wherein the one or more selected vehicle components comprise first and second selected vehicle components, wherein the first component identifier is representative of the first selected vehicle component, wherein the second component identifier is representative of the second selected vehicle component, wherein determining the one or more particular procedures comprises determining, according to the mapping data, the specific procedure based on the specific procedure being mapped to the component concept that associates the first and second component identifiers representative of the first and second selected vehicle components, and wherein providing the output comprises providing the output based on the specific procedure.

EEE 7 is the method of any one of EEE 1 to 6, wherein the particular collision-repair estimate is a first collision-repair estimate, wherein the visual identifier is a first visual identifier of the first collision-repair estimate, wherein the instruction also causes the display device to display at least a second visual identifier of a second collision-repair estimate, and wherein receiving input data indicative of selection of the visual identifier of the particular collision-repair estimate comprises receiving input data indicative of selection of the first visual identifier of the first collision-repair estimate.

EEE 8 is the method of any one of EEE 1 to 7, further comprising: further in response to receiving the input data indicative of selection of the visual identifier of the particular collision-repair estimate, the computing system instructing the display device to visually display respective descriptions of the plurality of vehicle components.

EEE 9 is the method of any one of EEE 1 to 8, wherein determining one or more particular procedures comprises determining at least first and second procedures, the method further comprises: in response to determining the first and second procedures, instructing, by the computing system, the display device to display a first visual representation of the first procedure and a second visual representation of the second procedure; and receiving, by the computing system, input data indicative of selection of one or more of the first or second visual representations of the first and second procedures, wherein providing the output comprises providing the output according to the selection of one or more of the first or second visual representations.

EEE 10 is the method of any one of EEE 1 to 9, wherein the visual identifier of the particular collision-repair estimate is displayed in a first graphical user interface (GUI) window, wherein the computing system receives the input data indicative of selection of the visual identifier by way of the first GUI window, wherein the visual indicators representative of the plurality of vehicle components are displayed in a second GUI window, and wherein the computing system receives the input data indicative of selection of one or more of the visual indicators by way of the second GUI window.

EEE 11 is the method of EEE 10, further comprising: instructing, by the computing system, the display device to display, in a third GUI window, one or more respective visual representations of the one or more particular procedures; and receiving, by the computing system and by way of the third GUI window, input data indicative of selection from among the one or more respective visual representations.

EEE 12 is the method of any one of EEE 1 to 11, wherein the output includes one or more of: (i) a listing of one or more collision-repair actions to be carried out with respect to at least one of the one or more selected vehicle components, (ii) an indication to replace at least one of the one or more selected vehicle components, (iii) a diagram associated with at least one of the one or more selected vehicle components, (iv) an image associated with at least one of the one or more selected vehicle components, (v) an indication of a respective location in the particular vehicle of at least one of the one or more selected vehicle components, (vi) an indication of a respective relationship between at least one of the one or more selected vehicle components and another vehicle component, (vii) information about operation of at least one of the one or more selected vehicle components, or (viii) information about configuration of at least one of the one or more selected vehicle components.

EEE 13 is the method of any one of EEE 1 to 12, wherein providing the output comprises one or more of: (i) instructing the display device or another device to visually display the output, (ii) instructing a speaker to emit an audible representation of the output, (iii) instructing a printer to print the output, (iv) storing the output in a data storage device of a collision-repair entity assigned to carry out repairs due to collision by the particular vehicle, or (v) storing the output in a third-party database associated with a third-party estimating system that generated the estimate data.

EEE 14 is the method of any one of EEE 1 to 13, further comprising: receiving, by the computing system from a vehicle repair tool, repair information associated with the particular vehicle; and providing, by the computing system, at least a portion of the repair information as part of the output.

EEE 15 is a computing system comprising: a computer-readable medium; at least one processor; and program instructions stored on the computer-readable medium and executable by the at least one processor to carry out operations, the operations comprising a method in accordance with any one of EEEs 1 to 14.

EEE 16 is the computing system of EEE 15, wherein the computer-readable medium contains the mapping data.

EEE 17 is the computing system of EEE 15 or 16, further comprising the display device.

EEE 18 is a computer-readable medium having stored thereon instructions executable by at least one processor to cause a computing system to perform operations, the operations comprising a method in accordance with any one of EEEs 1 to 14.

EEE 19 is a method comprising: receiving, by a computing system, a request indicating one or more particular component identifiers, wherein the computing system has access to mapping data that maps each of a plurality of procedures to one or more respective component identifiers, and wherein each procedure specifies information for repair of one or more vehicle components represented by the one or more respective component identifiers; in response to receiving the request, determining, by the computing system and according to the mapping data, one or more particular procedures based on the one or more particular component identifiers; generating, by the computing system, a reply to the request that includes information from the one or more particular procedures; and outputting, by the computing system, the generated reply to the request.

EEE 20 is the method of EEE 19, wherein the one or more respective component identifiers are used in collision-repair estimates.

EEE 21 is the method of EEE 19 or 20, wherein the one or more respective component identifiers comprise one or more part numbers.

EEE 21 is the method of EEE 21, wherein the one or more part numbers are assigned by one or more original equipment manufacturers (OEMs).

EEE 22 is the method of any one of EEE 19 to 21, wherein the one or more respective component identifiers are used in collision-repair estimates, wherein the mapping data comprises first and second mapping data, wherein the first mapping data maps (i) each of the plurality of procedures to (ii) one or more respective component identifiers used in a repair information system that contains the plurality of procedures, and wherein the second mapping data further maps (i) the one or more respective component identifiers used in the repair information system to (ii) the one or more respective component identifiers used in collision-repair estimates.

EEE 23 is the method of any one of EEE 19 to 22, wherein the mapping data specifies a component concept that associates at least first and second component identifiers as being related, and wherein the mapping data maps the component concept to a specific procedure of the plurality of procedures.

EEE 24 is the method of EEE 23, wherein the first component identifier is representative of a first vehicle component, wherein the second component identifier is representative of a second vehicle component, wherein the one or more particular component identifiers comprise the first and second component identifiers, wherein determining the one or more particular procedures comprises determining, according to the mapping data, the specific procedure based on the specific procedure being mapped to the component concept that associates the first and second component identifiers representative of the first and second vehicle components, and wherein generating the reply comprises generating the reply to include information from the specific procedure.

EEE 25 is the method of any one of EEE 19 to 24, wherein the one or more particular component identifiers represent one or more particular vehicle components, and wherein the reply including information from the one or more particular procedures comprises the reply including one or more of: (i) a listing of one or more repair actions to be carried out with respect to at least one of the one or more particular vehicle components, (ii) an indication to replace at least one of the one or more particular vehicle components, (iii) a diagram associated with at least one of the one or more particular vehicle components, (iv) an image associated with at least one of the one or more particular vehicle components, (v) an indication of a respective location in the particular vehicle of at least one of the one or more particular vehicle components, (vi) an indication of a respective relationship between at least one of the one or more particular vehicle components and another vehicle component, (vii) information about operation of at least one of the one or more particular vehicle components, or (viii) information about configuration of at least one of the one or more particular vehicle components.

EEE 26 is the method of any one of EEE 19 to 25, wherein receiving the request comprises receiving the request from a computing device displaying a graphical user interface (GUI) that enables submission of the request, and wherein outputting the generated reply to the request comprises transmitting the generated reply to the computing device.

EEE 27 is the method of EEE 26, wherein transmitting the generated reply to the computing device causes the computing device to visually display, on the GUI, at least a portion of the information from the one or more particular procedures.

EEE 28 is a computing system comprising: at least one processor; a data storage device containing the mapping data; and program instructions stored on the data storage device and executable by the at least one processor to perform operations, the operations comprising a method in accordance with any one of EEEs 19 to 27.

EEE 29 is a computer-readable medium having stored thereon instructions executable by at least one processor to cause a computing system to perform operations, the operations comprising a method in accordance with any one of EEEs 19 to 27.

We claim:

1. A method for instructing a device to display multiple graphical user interfaces with one or more interface controls in a particular sequence, the method comprising:
   determining, by a computing system, estimate data for a particular collision-repair estimate that specifies repair costs due to collision by a particular vehicle, wherein:

the estimate data specifies at least a plurality of part numbers representative of a plurality of vehicle components of the particular vehicle, the computing system has access to mapping data within non-transitory computer-readable media that maps each of a plurality of procedures to one or more respective part numbers used in collision-repair estimates, each procedure includes information for repair of one or more vehicle components represented by the one or more respective part numbers, the plurality of procedures includes a first procedure and a second procedure, the first procedure includes actions for a vehicle component represented by a first part number, the second procedure includes actions for the vehicle component represented by the first part number and a vehicle component represented by a second part number, the mapping data specifies a component concept that associates the first part number and the second part number as being related, the mapping data maps the first part number to the first procedure, the mapping data maps the second part number and the component concept to the second procedure, and after determining the estimate data, transmitting, by the computing system to a client computing device having a display device, an instruction that causes the client computing device to display a first graphical user interface;

displaying, on the display device, the first graphical user interface, wherein:

the first graphical user interface includes:

a visual identifier of the particular collision-repair estimate, a second identifier of a second collision-repair estimate, a first interface control positioned at a first spatial location on the display device adjacent the visual identifier of the particular collision-repair estimate, the first interface control enabling a selection of the visual identifier of the particular collision-repair estimate by touching the first spatial location on the display device, a second interface control positioned at a second spatial location on the display device adjacent the second identifier, the second interface control enabling a selection of the second identifier by touching the second spatial location on the display device, the first spatial location and the second spatial location are distinct spatial locations, and the plurality of part numbers are not displayed within the first graphical user interface;

determining, at the client computing device, a selection of the visual identifier of the particular collision-repair estimate via contact with the first spatial location on the display device;

receiving, by the computing system, input data indicative of the selection of the visual identifier of the particular collision-repair estimate from within the first graphical user interface, after receiving the input data, transmitting, by the computing system to the client computing device, an instruction that causes the client computing display device to display a second graphical user interface;

displaying, on the display device, the second graphical user interface, wherein:

the second graphical user interface includes visual indicators representative of the plurality of vehicle components and a plurality of interface controls within the second graphical user interface, and each interface control of the plurality of interface controls is positioned at a respective location adjacent a respective visual indicator of a respective vehicle component of the plurality of vehicle components, each interface control of the plurality of interface controls enabling a selection of a respective visual indicator of a respective vehicle component;

determining, at the client computing device, a selection of multiple visual indicators of a respective vehicle component via contact with interface controls corresponding to the multiple visual indicators;

receiving, by the computing system, input data indicative of the selection of multiple visual indicators from within the second graphical user interface, wherein:

multiple selected vehicle components from among the plurality of vehicle components are represented by the input data indicative of the selection of multiple visual indicators from within the second graphical user interface, the multiple selected vehicle components include a first selected vehicle component and a second selected vehicle component, the first part number is representative of the first selected vehicle component, and the second part number is representative of the second selected vehicle component;

responsively determining, by the computing system according to the mapping data within non-transitory computer-readable media, one or more particular procedures based on multiple particular part numbers representative of the multiple selected vehicle components, wherein determining the one or more particular procedures comprises determining, according to the mapping data, the second procedure based on the second procedure being mapped to the component concept that associates the first part number and the second part number as being related; and providing, by the computing system, an output to the display device, wherein:

the output includes the second procedure, but not the first procedure, providing the output includes providing an instruction that causes the display device to display a third graphical user interface, and the third graphical user interface includes an interface control selectable to cause the second procedure to be printed, displayed, emitted audibly, transmitted to another device, or saved within a non-transitory data storage device.

2. The method of claim 1, wherein determining the estimate data comprises receiving the estimate data from a data storage device of a collision-repair entity assigned to carry out repairs due to collision by the particular vehicle.

3. The method of claim 1, wherein determining the estimate data comprises receiving the estimate data from a third-party database associated with a third-party estimating system that generated the estimate data.

4. The method of claim 1, wherein the mapping data comprises first mapping data and second mapping data, wherein the first mapping data maps (i) each of the plurality of procedures to (ii) one or more respective component identifiers used in a repair information system that contains the plurality of procedures, and wherein the second mapping data further maps (i) the one or more respective component identifiers used in the repair information system to (ii) the one or more respective part numbers used in collision-repair estimates.

5. The method of claim 1, further comprising:
in response to receiving the input data indicative of the selection of the visual identifier of the particular collision-repair estimate from within the first graphical user interface, the computing system instructing the display device to visually display respective descriptions of the plurality of vehicle components.

6. The method of claim 1, wherein determining one or more particular procedures comprises determining at least the first procedure and the second procedure, the method further comprises:
in response to determining the first procedure and the second procedure, instructing, by the computing system, the display device to display a first visual representation of the first procedure and a second visual representation of the second procedure; and
receiving, by the computing system, input data indicative of selection of one or more of the first visual representation of the first procedure or the second visual representation of the second procedure,
wherein the output comprises an output according to the input data indicative of selection of one or more of the first visual representation or the second visual representation.

7. The method of claim 1, wherein the output includes one or more of: (i) a listing of one or more collision-repair actions to be carried out with respect to at least one of the multiple selected vehicle components, (ii) an indication to replace at least one of the multiple selected vehicle components, (iii) a diagram associated with at least one of the multiple selected vehicle components, (iv) an image associated with at least one of the multiple selected vehicle components, (v) an indication of a respective location in the particular vehicle of at least one of the multiple selected vehicle components, (vi) an indication of a respective relationship between at least one of the multiple selected vehicle components and another vehicle component, (vii) information about operation of at least one of the multiple selected vehicle components, or (viii) information about configuration of at least one of the multiple selected vehicle components.

8. The method of claim 1, wherein providing the output comprises one or more of: (i) instructing the display device or another device to visually display the output, (ii) instructing a speaker to emit an audible representation of the output, (iii) instructing a printer to print the output, (iv) storing the output in a data storage device of a collision-repair entity assigned to carry out repairs due to collision by the particular vehicle, or (v) storing the output in a third-party database associated with a third-party estimating system that generated the estimate data.

9. The method of claim 1, further comprising:
receiving, by the computing system from a vehicle repair tool, repair information associated with the particular vehicle, wherein the output includes at least a portion of the repair information.

10. A computing system comprising:
non-transitory computer-readable media;
one or more processors; and
program instructions stored on the non-transitory computer-readable media and executable by the one or more processors to carry out operations comprising:
determining estimate data for a particular collision-repair estimate that specifies repair costs due to collision by a particular vehicle, wherein:
the estimate data specifies at least a plurality of part numbers representative of a plurality of vehicle components of the particular vehicle,
the computing system has access to mapping data within the non-transitory computer-readable media that maps each of a plurality of procedures to one or more respective part numbers used in collision-repair estimates,
each procedure includes information for repair of one or more vehicle components represented by the one or more respective part numbers,
the plurality of procedures includes a first procedure and a second procedure,
the first procedure includes actions for a vehicle component represented by a first part number,
the second procedure includes actions for the vehicle component represented by the first part number and a vehicle component represented by a second part number,
the mapping data specifies a component concept that associates the first part number and the second part number as being related,
the mapping data maps the first part number to the first procedure,
the mapping data maps the second part number and the component concept to the second procedure, and
after determining the estimate data, transmitting, to a client computing device having a display device, an instruction that causes the client computing device to display a first graphical user interface;
displaying, on the display device, the first graphical user interface, wherein:
the first graphical user interface includes:
a visual identifier of the particular collision-repair estimate,
a second identifier of a second collision-repair estimate,
a first interface control positioned at a first spatial location on the display device adjacent the visual identifier of the particular collision-repair estimate, the first interface control enabling a selection of the visual identifier of the particular collision-repair estimate by touching the first spatial location on the display device,
a second interface control positioned at a second spatial location on the display device adjacent the second identifier, the second interface control enabling a selection of the second identifier by touching the second spatial location on the display device,
the first spatial location and the second spatial location are distinct spatial locations, and
the plurality of part numbers are not displayed within the first graphical user interface;
determining, at the client computing device, a selection of the visual identifier of the particular collision-repair estimate via contact with the first spatial location on the display device;
receiving input data indicative of the selection of the visual identifier of the particular collision-repair estimate from within the first graphical user interface,
after receiving the input data, transmitting, by the computing system to the client computing device, an instruction that causes the client computing device to display a second graphical user interface;
displaying, on the display device, the second graphical user interface, wherein:
the second graphical user interface includes visual indicators representative of the plurality of vehicle components and a plurality of interface controls within the second graphical user interface, and
each interface control of the plurality of interface controls is positioned at a respective location adjacent a respective visual indicator of a respective vehicle component of the plurality of vehicle components, each interface control of the plurality of interface controls enabling a selection of a respective visual indicator of a respective vehicle component;
determining, at the client computing device, a selection of multiple visual indicators of a respective vehicle component via contact with interface controls corresponding to the multiple visual indicators;
receiving input data indicative of the selection of multiple visual indicators from within the second graphical user interface, wherein:
multiple selected vehicle components from among the plurality of vehicle components are represented by the input data indicative of the selection of multiple visual indicators from within the second graphical user interface,
the multiple selected vehicle components include a first selected vehicle component and a second selected vehicle component,
the first part number is representative of the first selected vehicle component, and
the second part number is representative of the second selected vehicle component;
responsively determining, according to the mapping data within non-transitory computer-readable media, one or more particular procedures based on multiple particular part numbers representative of the multiple selected vehicle components, wherein determining the one or more particular procedures comprises determining, according to the mapping data, the second procedure based on the second procedure being mapped to the component concept that associates the first part number and the second part number as being related; and
providing an output to the display device, wherein:
the output includes the second procedure, but not the first procedure,
providing the output includes providing an instruction that causes the display device to display a third graphical user interface, and
the third graphical user interface includes an interface control selectable to cause the second procedure to be printed, displayed, emitted audibly, transmitted to another device, or saved within a non-transitory data storage device.

11. The computing system of claim 10, further comprising the display device.

12. The computing system of claim 10, wherein determining the estimate data comprises receiving the estimate data from a data storage device of a collision-repair entity assigned to carry out repairs due to collision by the particular vehicle.

13. The computing system of claim 12, wherein the non-transitory computer-readable media includes the data storage device of the collision-repair entity.

14. The computing system of claim 10, wherein determining the estimate data comprises receiving the estimate data from a third-party database associated with a third-party estimating system that generated the estimate data.

15. The computing system of claim 10, wherein the mapping data comprises first mapping data and second mapping data, wherein the first mapping data maps (i) each of the plurality of procedures to (ii) one or more respective component identifiers used in a repair information system that contains the plurality of procedures, and wherein the second mapping data further maps (i) the one or more respective component identifiers used in the repair information system to (ii) the one or more respective part numbers used in collision-repair estimates.

16. The computing system of claim 10, the operations further comprising:
in response to receiving the input data indicative of the selection of the visual identifier of the particular collision-repair estimate, instructing the display device to visually display respective descriptions of the plurality of vehicle components.

17. The computing system of claim 10, wherein determining one or more particular procedures comprises determining at least the first procedure and the second procedure, the operations further comprising:
in response to determining the first procedure and the second procedure, instructing the display device to display a first visual representation of the first procedure and a second visual representation of the second procedure; and
receiving input data indicative of selection of one or more of the first visual representation of the first procedure or the second visual representation of the second procedure,
wherein the output comprises an output according to the input data indicative of selection of one or more of the first visual representation or the second visual representation.

18. The computing system of claim 10, wherein the output includes one or more of: (i) a listing of one or more collision-repair actions to be carried out with respect to at least one of the multiple selected vehicle components, (ii) an indication to replace at least one of the multiple selected vehicle components, (iii) a diagram associated with at least one of the multiple selected vehicle components, (iv) an image associated with at least one of the multiple selected vehicle components, (v) an indication of a respective location in the particular vehicle of at least one of the multiple selected vehicle components, (vi) an indication of a respective relationship between at least one of the multiple selected vehicle components and another vehicle component, (vii) information about operation of at least one of the multiple selected vehicle components, or (viii) information about configuration of at least one of the multiple selected vehicle components.

19. The computing system of claim 10, wherein providing the output comprises one or more of: (i) instructing the display device or another device to visually display the output, (ii) instructing a speaker to emit an audible representation of the output, (iii) instructing a printer to print the output, (iv) storing the output in a data storage device of a collision-repair entity assigned to carry out repairs due to collision by the particular vehicle, or (v) storing the output in a third-party database associated with a third-party estimating system that generated the estimate data.

20. The computing system of claim 10, the operations further comprising:

receiving, from a vehicle repair tool, repair information associated with the particular vehicle, wherein the output includes at least a portion of the repair information.

21. A non-transitory computer-readable media having stored thereon instructions executable by one or more processors to cause a computing system to perform operations comprising:

determining estimate data for a particular collision-repair estimate that specifies repair costs due to collision by a particular vehicle, wherein:

the estimate data specifies at least a plurality of part numbers representative of a plurality of vehicle components of the particular vehicle, the computing system has access to mapping data within the non-transitory computer-readable media that maps each of a plurality of procedures to one or more respective part numbers used in collision-repair estimates, each procedure includes information for repair of one or more vehicle components represented by the one or more respective part numbers, the plurality of procedures includes a first procedure and a second procedure, the first procedure includes actions for a vehicle component represented by a first part number, the second procedure includes actions for the vehicle component represented by the first part number and a vehicle component represented by a second part number, the mapping data specifies a component concept that associates the first part number and the second part number as being related, the mapping data maps the first part number to the first procedure, the mapping data maps the second part number and the component concept to the second procedure, and after determining the estimate data, transmitting, to a client computing device having a display device, an instruction that causes the client computing device to display a first graphical user interface;

displaying, on the display device, the first graphical user interface, wherein:

the first graphical user interface includes:
a visual identifier of the particular collision-repair estimate,
a second identifier of a second collision-repair estimate,
a first interface control positioned at a first spatial location on the display device adjacent the visual identifier of the particular collision-repair estimate, the first interface control enabling a selection of the visual identifier of the particular collision-repair estimate by touching the first spatial location on the display device,
a second interface control positioned at a second spatial location on the display device adjacent the second identifier, the second interface control enabling a selection of the second identifier by touching the second spatial location on the display device,
the first spatial location and the second spatial location are distinct spatial locations, and
the plurality of part numbers are not displayed within the first graphical user interface;

determining, at the client computing device, a selection of the visual identifier of the particular collision-repair estimate via contact with the first spatial location on the display device;

receiving input data indicative of the selection of the visual identifier of the particular collision-repair estimate from within the first graphical user interface, after receiving the input data, transmitting, by the computing system to the client computing device, an instruction that causes the client computing display to display a second graphical user interface;

displaying, on the display device, the second graphical user interface, wherein:

the second graphical user interface includes visual indicators representative of the plurality of vehicle components and a plurality of interface controls within the second graphical user interface, and each interface control of the plurality of interface controls is positioned at a respective location adjacent a respective visual indicator of a respective vehicle component of the plurality of vehicle components, each interface control of the plurality of interface controls enabling a selection of a respective visual indicator of a respective vehicle component;

determining, at the client computing device, a selection of multiple visual indicators of a respective vehicle component via contact with interface controls corresponding to the multiple visual indicators;

receiving input data indicative of the selection of multiple visual indicators from within the second graphical user interface, wherein:

multiple selected vehicle components from among the plurality of vehicle components are represented by the input data indicative of the selection of multiple visual indicators from within the second graphical user interface, the multiple selected vehicle components include a first selected vehicle component and a second selected vehicle component, the first part number is representative of the first selected vehicle component, and the second part number is representative of the second selected vehicle component;

responsively determining, according to the mapping data within non-transitory computer-readable media, one or more particular procedures based on multiple particular part numbers representative of the multiple selected vehicle components, wherein determining the one or more particular procedures comprises determining, according to the mapping data, the second procedure based on the second procedure being mapped to the component concept that associates the first part number and the second part number as being related; and providing an output to the display device, wherein:

the output includes the second procedure, but not the first procedure, providing the output includes providing an instruction that causes the display device to display a third graphical user interface, and the third graphical user interface includes an interface control selectable to cause the second procedure to be printed, displayed, emitted audibly, transmitted to another device, or saved within a non-transitory data storage device.

22. The non-transitory computer-readable media of claim 21, wherein determining the estimate data comprises receiving the estimate data from a data storage device of a collision-repair entity assigned to carry out repairs due to collision by the particular vehicle.

23. The non-transitory computer-readable media of claim 21, wherein determining the estimate data comprises receiving the estimate data from a third-party database associated with a third-party estimating system that generated the estimate data.

24. The non-transitory computer-readable media of claim 21, wherein the mapping data comprises first mapping data and second mapping data, wherein the first mapping data maps (i) each of the plurality of procedures to (ii) one or more respective component identifiers used in a repair information system that contains the plurality of procedures, and wherein the second mapping data further maps (i) the one or more respective component identifiers used in the repair information system to (ii) the one or more respective part numbers used in collision-repair estimates.

25. The non-transitory computer-readable media of claim 21, wherein the operations further comprise:
in response to receiving the input data indicative of the selection of the visual identifier of the particular collision-repair estimate from within the first graphical user interface, instructing the display device to visually display respective descriptions of the plurality of vehicle components.

26. The non-transitory computer-readable media of claim 21, wherein:
determining one or more particular procedures comprises determining at least the first procedure and the second procedure, and
the operations further comprise:
in response to determining the first procedure and the second procedure, instructing the display device to display a first visual representation of the first procedure and a second visual representation of the second procedure; and
receiving, input data indicative of selection of one or more of the first visual representation of the first procedure or the second visual representation of the second procedure,
wherein the output comprises an output according to the input data indicative of selection of one or more of the first visual representation or the second visual representation.

27. The non-transitory computer-readable media of claim 21, wherein the output includes one or more of: (i) a listing of one or more collision-repair actions to be carried out with respect to at least one of the multiple selected vehicle components, (ii) an indication to replace at least one of the multiple selected vehicle components, (iii) a diagram associated with at least one of the multiple selected vehicle components, (iv) an image associated with at least one of the multiple selected vehicle components, (v) an indication of a respective location in the particular vehicle of at least one of the multiple selected vehicle components, (vi) an indication of a respective relationship between at least one of the multiple selected vehicle components and another vehicle component, (vii) information about operation of at least one of the multiple selected vehicle components, or (viii) information about configuration of at least one of the multiple selected vehicle components.

28. The non-transitory computer-readable media of claim 21, wherein providing the output comprises one or more of: (i) instructing the display device or another device to visually display the output, (ii) instructing a speaker to emit an audible representation of the output, (iii) instructing a printer to print the output, (iv) storing the output in a data storage device of a collision-repair entity assigned to carry out repairs due to collision by, the particular vehicle, or (v) storing the output in a third-party database associated with a third-party estimating system that generated the estimate data.

29. The non-transitory computer-readable media of claim 21, wherein the operations further comprise:
receiving, from a vehicle repair tool, repair information associated with the particular vehicle, wherein the output includes at least a portion of the repair information.

30. The method of claim 11, wherein the output includes one or more from among: an extensible markup language (XML) file, a file with a PDF extension, an image file, or a text file.

31. The computing system of claim 10, wherein the output includes one or more from among: an extensible markup language (XML) file, a file with a PDF extension, an image file, or a text file.

32. The computing system of claim 10, wherein the display device includes one or more from among: a smart phone, a tablet device, a wearable computing device, a wireless web-watch, a personal headset device, a personal computer, a laptop computer, or a vehicle repair tool.

33. The computing system of claim 10, wherein:
the display device includes a vehicle repair tool operable to connect to a vehicle, and
the vehicle repair tool is operable to send a vehicle data message to the vehicle and receive a vehicle data message from the vehicle.

34. The computing system of claim 33, wherein the vehicle data message to the vehicle includes a message to request performance of one or more from among: a functional test, a reset procedure, a calibration procedure, a reprogramming procedure, or responding to a request for a parameter that corresponds to a parameter identifier.

* * * * *